(12) United States Patent
Korth et al.

(10) Patent No.: US 7,662,874 B2
(45) Date of Patent: Feb. 16, 2010

(54) RUBBER MIXTURES

(75) Inventors: Karsten Korth, Grenzach-Wyhlen (DE); Andre Hasse, Linnich-Ederen (DE); Philipp Albert, Lörrach (DE); Oliver Klockmann, Niederzier (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 11/700,612

(22) Filed: Jan. 31, 2007

(65) Prior Publication Data

US 2007/0203274 A1 Aug. 30, 2007

(30) Foreign Application Priority Data

Feb. 24, 2006 (DE) .................. 10 2006 008 670

(51) Int. Cl.
*B60C 1/00* (2006.01)
(52) U.S. Cl. ...................... 524/191; 524/262
(58) Field of Classification Search ................. 524/262, 524/191

See application file for complete search history.

(56) References Cited

U.S. PATENT DOCUMENTS

2003/0144394 A1* 7/2003 Penot et al. ................ 524/262

FOREIGN PATENT DOCUMENTS

| DE | 2 255 577 | 6/1974 |
| EP | 0 994 150 A1 | 4/2000 |
| EP | 1 285 926 A1 | 2/2003 |
| EP | 1 609 516 A1 | 12/2005 |
| GB | 1 439 247 | 6/1976 |
| JP | 2002-145890 | 5/2002 |
| JP | 2002-145890 A | 5/2002 |

* cited by examiner

*Primary Examiner*—Peter D Mulcahy
(74) *Attorney, Agent, or Firm*—Smith, Gambrell & Russell, LLP

(57) ABSTRACT

Rubber mixtures are disclosed comprising (A) at least one styrene-butadiene rubber, (B) at least one filler and (C) at least one polysulphidic organo(alkyl polyether silane) of the general formula I $$[(X)(X')(X'')Si-R^I]_2-S_m \quad\quad I.$$

The mixtures are prepared by mixing at least one styrene-butadiene rubber, and at least one filler and one polysulphidic organo(alkyl polyether silane) of the formula (I). The rubber mixtures can be used for the production of mouldings.

10 Claims, No Drawings

RUBBER MIXTURES

REFERENCE TO RELATED APPLICATION

This application claims the benefit of German priority Application No. 10 2006 008 670.8 filed Feb. 24, 2006, which is relied on and incorporated herein by reference.

INTRODUCTION AND BACKGROUND

The invention relates to rubber mixtures, to processes for their preparation, and also to their use.

It is known that silanes can be used as coupling agents. For example, aminoalkyltrialkoxysilanes, methacryloxyalkyltrialkoxysilanes, polysulphanalkyltrialkoxysilanes and mercaptoalkyltrialkoxysilanes are used as coupling agents between inorganic materials and organic polymers, as crosslinking agents and as surface-modifying agents.

These coupling agents or bonding agents form bonds with the filler and also with the elastomer and thus bring about good interaction between the filler surface and the elastomer.

It is also known that the use of commercially available silane coupling agents (DE 22 55 577) having three alkoxy substituents on the silicon atom leads to liberation of considerable amounts of alcohol during and after coupling to the filler. Since trimethoxy- and triethoxy-substituted silanes are generally used, considerable amounts of the corresponding alcohols, methanol and ethanol, are liberated.

It is also known that methoxy- and ethoxy-substituted silanes are more reactive than the corresponding long-chain alkoxy-substituted silanes and can therefore couple more rapidly to the filler, and technical and economic reasons have hitherto made it essential to use methoxy and ethoxy substituents.

EP 1285926 discloses organosilicon compounds of the general formulae

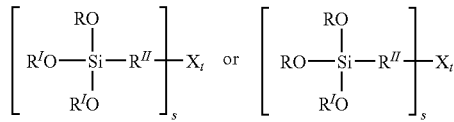

where R is a methyl or ethyl group, $R^I$ is identical or different and is a $C_9$-$C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group, X is $NH_{(3-s)}$, O(C=O)—$R^{III}$, SH, S, S(C=O)—$R^{III}$ or H.

JP 2002145890 moreover discloses compounds of the general formula $[[(R^1O—)(R^2—O—)_n]_p—R^3{}_{3-p}Si—R^4]_2—S_m$.

EP1609516 discloses a process for the extraction of substances from silane-modified fillers. The silanes for modification can be compounds of the formula Z—A—$S_x$—A—Z.

DE 102005020536.4 and DE 102005020534.8 disclose processes for the preparation of mercaptoorganyl(alkoxysilanes).

A disadvantage of the known rubber mixtures comprising an organo(alkyl polyether silane) is low elongation at break.

SUMMARY OF THE INVENTION

It is an object of the present invention to provide rubber mixtures which have not only reduced emission of alcohol during the mixing process but also improved elongation at break.

The invention provides rubber mixtures, comprising
at least one styrene-butadiene rubber,
at least one filler and
at least one polysulphidic organo(alkyl polyether silane) of the general formula I

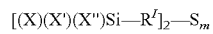  I where

X is an alkyl polyether group O—$((CR^{II}{}_2)_w—O—)_t$Alk having from 14 to 29 carbon atoms, preferably from 16 to 27, particularly preferably from 18 to 25, very particularly preferably from 19 to 23, carbon atoms, preferably O—($CH_2$—$CH_2$—O—)$_t$Alk, O—($CH(CH_3)$—$CH_2$—O—)$_t$-Alk, O—($CH_2$—$CH_2$—$CH_2$—$CH_2$—O—)$_t$Alk or ($CH_2$—CH($CH_3$)—$CH_2$—O)$_t$Alk, where t=from 2 to 9, preferably from 3 to 9, particularly preferably from 4 to 9, very particularly preferably from 5 to 9, extremely preferably from 5 to 6, w=from 2 to 9, preferably from 3 to 9, particularly preferably from 4 to 9, very particularly preferably from 4 to 8, $R^{II}$ is, each independently of the other, H, a phenyl group or an alkyl group, preferably a $C_1$-$C_{11}$ alkyl group, particularly preferably a $CH_3$ group or $CH_3$—$CH_2$ group, Alk is a branched or unbranched, saturated or unsaturated, aliphatic, aromatic or mixed aliphatic/aromatic monovalent $C_{10}$-$C_{25}$-, preferably $C_{10}$-$C_{19}$-, particularly preferably $C_{11}$-$C_{18}$-, very particularly preferably $C_{12}$-$C_{17}$-, extremely preferably $C_{13}$-$C_{17}$-hydrocarbon group, X' is branched or unbranched alkyl, preferably $C_1$-$C_{18}$ alkyl, particularly preferably —$CH_3$, —$CH_2$—$CH_3$, —CH($CH_3$)—$CH_3$, —$CH_2$—$CH_2$—$CH_3$ or $C_4$-$C_{15}$-alkyl, branched or unbranched alkoxy, preferably $C_1$-$C_{18}$ alkoxy, particularly preferably —$OCH_3$, —$OCH_2$—$CH_3$, —OCH($CH_3$)—$CH_3$, —$OCH_2$—$CH_2$—$CH_3$, —$OC_{12}H_{25}$, —$OC_{13}H_{27}$, —$OC_{14}H_{29}$ or $C_{15}$-$C_{18}$ alkoxy, branched or unbranched $C_2$-$C_{25}$ alkenyloxy, preferably $C_4$-$C_{20}$ alkenyloxy, particularly preferably $C_6$-$C_{18}$ alkenyloxy, $C_6$-$C_{35}$ aryloxy, preferably $C_9$-$C_{30}$ aryloxy, particularly preferably phenyloxy (—$OC_6H_5$) or $C_9$-$C_{18}$ aryloxy, a branched or unbranched $C_7$-$C_{35}$ alkylaryloxy group, preferably $C_9$-$C_{30}$ alkylaryloxy group, particularly preferably benzyloxy (—O—$CH_2$—$C_6H_5$) or —O—$CH_2$—$CH_2$—$C_6H_5$, a branched or unbranched $C_7$-$C_{35}$ aralkyloxy group, preferably $C_9$-$C_{25}$ aralkyloxy group, particularly preferably tolyloxy (—O—$C_6H_4$—$CH_3$) or a $C_9$-$C_{18}$ aralkyloxy group, or is an X, X" is branched or unbranched alkyl, preferably $C_1$-$C_{18}$ alkyl, particularly preferably $CH_3$, $CH_2$—$CH_3$, CH($CH_3$)—$CH_3$, $CH_2$—$CH_2$—$CH_3$ or $C_4$-$C_{15}$-alkyl, branched or unbranched alkoxy, preferably $C_1$-$C_{18}$ alkoxy, particularly preferably —$OCH_3$, —$OCH_2$—$CH_3$, —OCH($CH_3$)—$CH_3$, —$OCH_2$—$CH_2$—$CH_3$ or $C_4$-$C_{15}$ alkoxy, $C_2$-$C_{25}$ alkenyloxy, preferably $C_4$-$C_{20}$ alkenyloxy, particularly preferably $C_6$-$C_{18}$ alkenyloxy, $C_6$-$C_{35}$ aryloxy, preferably $C_9$-$C_{30}$ aryloxy, particularly preferably phenyloxy (—$OC_6H_5$) or $C_9$-$C_{18}$ aryloxy, a branched or unbranched $C_7$-$C_{35}$ alkylaryloxy group, preferably $C_9$-$C_{30}$ alkylaryloxy group, particularly preferably benzyloxy (—O—$CH_2$—$C_6H_5$) or —O—$CH_2$—$CH_2$—$C_6H_5$, a branched or unbranched $C_7$-$C_{35}$ aralkyloxy group, preferably $C_9$-$C_{25}$ aralkyloxy group, particularly preferably tolyloxy (—O—$C_6H_4$—$CH_3$) or a $C_9$-$C_{18}$ aralkyloxy group, or is an X, $R^I$ is a branched or unbranched, saturated or unsaturated, aliphatic, aromatic or mixed aliphatic/aromatic divalent $C_1$-$C_{30}$ hydrocarbon group, if appropriate having substitution, m is from 1 to 12, preferably from 1.5 to 8, particularly preferably from 1.8 to 4.

$R^I$ can be $-CH_2-$, $-CH_2CH_2-$, $-CH_2CH_2CH_2-$, $-CH_2CH_2CH_2CH_2-$, $-CH(CH_3)-$, $-CH_2CH(CH_3)-$, $-CH(CH_3)CH_2-$, $-C(CH_3)_2-$, $-CH(C_2H_5)-$, $-CH_2CH_2CH(CH_3)-$, $-CH_2(CH_3)CH_2CH_2-$, $-CH_2CH(CH_3)CH_2-$, $-CH_2CH_2CH_2CH_2CH_2-$, $-CH_2CH_2CH_2CH_2CH_2CH_2-$, $-CH_2CH_2CH_2CH_2CH_2CH_2CH_2-$, $-CH_2CH_2CH_2CH_2CH_2CH_2CH_2CH_2-$, $-CH_2CH_2CH_2CH_2CH_2CH_2CH_2CH_2CH_2-$, $-CH_2CH_2CH_2CH_2CH_2CH_2CH_2CH_2CH_2CH_2-$, $-CH_2CH_2CH_2CH_2CH_2CH_2CH_2CH_2CH_2CH_2CH_2-$, $-CH_2CH_2CH_2CH_2CH_2CH_2CH_2CH_2CH_2CH_2CH_2CH_2-$, $CH_2CH_2CH_2CH_2CH_2CH_2CH_2CH_2CH_2CH_2CH_2CH_2CH_2CH_2CH_2-$, $-CH_2CH_2CH_2CH_2CH_2CH_2CH_2CH_2CH_2CH_2CH_2CH_2CH_2CH_2CH_2CH_2-$ or 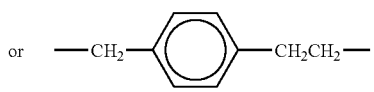

Polysulphidic organo(alkyl polyether silanes) of the general formula I can particularly preferably be mixtures of substances composed of compounds of the general formula I, where m is from 1.8 to 2.8 and from 3.0 to 3.9.

If X' and X" are ($CH_3O-$) or ($C_2H_5-O-$), X can preferably be $O-(CH_2-CH_2-O-)_t$-Alk or $O-(CH(CH_3)-CH_2-O-)_t$-Alk, where t=from 2 to 9, preferably from 3 to 9, particularly preferably from 4 to 9, very particularly preferably from 5 to 9.

If X' is X and X" is ($CH_3O$) or ($C_2H_5-O-$), X can preferably be $O-(CH_2-CH_2-O-)_t$-Alk or $O-(CH(CH_3)-CH_2-O$-t-Alk, where t=from 2 to 9, preferably from 3 to 9, particularly preferably from 4 to 9, very particularly preferably from 5 to 9.

If X' and X" are X, X can preferably be $O-(CH_2-CH_2-O-)_t$-Alk or $O-(CH(CH_3)-CH_2-O-)_t$-Alk, where t=from 2 to 9, preferably from 3 to 9, particularly preferably from 4 to 9, very particularly preferably from 5 to 9.

If X' is X and X" is alkyl having from 1 to 6 carbon atoms, t can be from 3 to 9, preferably from 4 to 9, particularly preferably from 5 to 9, very particularly preferably from 6 to 9, extremely preferably from 7 to 9.

If X' and X" are alkyl having from 1 to 6 carbon atoms, t can be from 3 to 9, preferably from 4 to 9, particularly preferably from 5 to 9, very particularly preferably from 6 to 9, extremely preferably from 7 to 9.

X in formula I can be an alkoxylated castor oil (e.g. CAS 61791-12-6).

X in formula I can be an alkoxylated oleylamine (e.g. CAS 26635-93-8).

Compounds where m=1 can be present in mixtures of compounds comprising polysulphidic organo(alkyl polyether silanes) of the general formula I to an extent of from 0.01 to 20% by weight, preferably from 0.1 to 15% by weight, particularly preferably from 0.1 to 10% by weight, very particularly preferably from 2 to 8% by weight.

The alkyl polyether group $O-((CR^{II}_2)_w-O-)_t$ Alk can contain ethylene oxide units ($CH_2-CH_2-O$), propylene oxide units, such as ($CH(CH_3)-CH_2-O$) or ($CH_2-CH(CH_3)-O$), or butylene oxide units, such as ($-CH_2-CH_2-CH_2-CH_2-$), ($-CH(CH_2-CH_3)-CH_2-O$) or ($-CH_2-CH(CH_2-CH_3)-O$).

The alkyl polyether group $O-(CR^{II}_2-CR^{II}_2-O)_t$ can preferably be:

$O-(-CH_2-CH_2-O-)_a$, $O-(-CH(CH_3)-CH_2-O-)_a$, $O-(-CH_2-CH(CH_3)-O-)_a$, $O-(-CH_2-CH_2-O-)_a(-CH(CH_3)-CH_2-O-)$, $O-(-CH_2-CH_2-O-)(-CH(CH_3)-CH_2-O-)_a$, $O-(-CH_2-CH_2-O-)_a(-CH_2-CH(CH_3)-O-)$, $O-(-CH_2-CH_2-O-)(-CH_2-CH(CH_3)-O-)_a$, $O-(-CH(CH_3)-CH_2-O-)_a(-CH_2-CH(CH_3)-O-)$, $O-(-CH(CH_3)-CH_2-O-)(-CH_2-CH(CH_3)-O-)_a$, $O-(-CH_2-CH_2-O-)_a(-CH(CH_3)-CH_2-O-)_b(-CH_2-CH(CH_3)-O-)_c$ or or a combination of these, where a+b+c=t.

The indices a, b and c are whole numbers and indicate the number of repeat units.

The alkyl polyether group $O-(CR^{II}_2-CR^{II}_2-O)_t$-Alk can be $O-(CH_2-CH_2O)_2-C_{10}H_{21}$, $O-(CH_2-CH_2O)_3-C_{10}H_{21}$, $O-(CH_2-CH_2O)_4-C_{10}H_{21}$, $O-(CH_2-CH_2O)_5-C_{10}H_{21}$, $O-(CH_2-CH_2O)_6-C_{10}H_{21}$, $O-(CH_2-CH_2O)_7-C_{10}H_{21}$, $O-(CH(CH_3)-CH_2O)_2-C_{10}H_{21}$, $O-(CH(CH_3)-CH_2O)_3-C_{10}H_{21}$, $O-(CH(CH_3)-CH_2O)_4-C_{10}H_{21}$, $O-(CH(CH_3)-CH_2O)_5-C_{10}H_{21}$, $O-(CH(CH_3)-CH_2O)_6-C_{10}H_{21}$, $O-(CH_2-CH_2O)_2-C_{11}H_{23}$, $O-(CH_2-CH_2O)_3-C_{11}H_{23}$, $O-(CH_2-CH_2O)_4-C_{11}H_{23}$, $O-(CH_2-CH_2O)_5-C_{11}H_{23}$, $O-(CH_2-CH_2O)_6-C_{11}H_{23}$, $O-(CH_2-CH_2O)_7-C_{11}H_{23}$, $O-(CH(CH_3)-CH_2O)_2-C_{11}H_{23}$, $O-(CH(CH_3)-CH_2O)_3-C_{11}H_{23}$, $O-(CH(CH_3)-CH_2O)_4-C_{11}H_{23}$, $O-(CH(CH_3)-CH_2O)_5-C_{11}H_{23}$, $O-(CH(CH_3)-CH_2O)_6-C_{11}H_{23}$, $O-(CH_2-CH_2O)_2-C_{12}H_{25}$, $O-(CH_2-CH_2O)_3-C_{12}H_{25}$, $O-(CH_2-CH_2O)_4-C_{12}H_{25}$, $O-(CH_2-CH_2O)_5-C_{12}H_{25}$, O—(CH$_2$—CH$_2$O)$_6$—C$_{12}$H$_{25}$, O—(CH$_2$—CH$_2$O)$_7$—C$_{12}$H$_{25}$, O—(CH(CH$_3$)—CH$_2$O)$_2$—C$_{12}$H$_{25}$, O—(CH(CH$_3$)—CH$_2$O)$_3$—C$_{12}$H$_{25}$, O—(CH(CH$_3$)—CH$_2$O)$_4$—C$_{12}$H$_{25}$, O—(CH(CH$_3$)—CH$_2$O)$_5$—C$_{12}$H$_{25}$, O—(CH$_2$—CH$_2$O)$_2$—C$_{13}$H$_{27}$, O—(CH$_2$—CH$_2$O)$_3$—C$_{13}$H$_{27}$, O—(CH$_2$—CH$_2$O)$_4$—C$_{13}$H$_{27}$, O—(CH$_2$—CH$_2$O)$_5$—C$_{13}$H$_{27}$, O—(CH$_2$—CH$_2$O)$_6$—C$_{13}$H$_{27}$, O—(CH$_2$—CH$_2$O)$_7$—C$_{13}$H$_{27}$, O—(CH(CH$_3$)—CH$_2$O)$_2$—C$_{13}$H$_{27}$, O—(CH(CH$_3$)—CH$_2$O)$_3$—C$_{13}$H$_{27}$, O—(CH(CH$_3$)—CH$_2$O)$_4$—C$_{13}$H$_{27}$, O—(CH(CH$_3$)—CH$_2$O)$_5$—C$_{13}$H$_{27}$, O—(CH$_2$—CH$_2$O)$_2$—C$_{14}$H$_{29}$, O—(CH$_2$—CH$_2$O)$_3$—C$_{14}$H$_{29}$, O—(CH$_2$—CH$_2$O)$_4$—C$_{14}$H$_{29}$, O—(CH$_2$—CH$_2$O)$_5$—C$_{14}$H$_{29}$, O—(CH$_2$—CH$_2$O)$_6$—C$_{14}$H$_{29}$, O—(CH$_2$—CH$_2$O)$_7$—C$_{14}$H$_{29}$, O—(CH(CH$_3$)—CH$_2$O)$_2$—C$_{14}$H$_{29}$, O—(CH(CH$_3$)—CH$_2$O)$_3$—C$_{14}$H$_{29}$, O—(CH(CH$_3$)—CH$_2$O)$_4$—C$_{14}$H$_{29}$, O—(CH(CH$_3$)—CH$_2$O)$_5$—C$_{14}$H$_{29}$, O—(CH$_2$—CH$_2$O)$_2$—C$_{15}$H$_{31}$, O—(CH$_2$—CH$_2$O)$_3$—C$_{15}$H$_{31}$, O—(CH$_2$—CH$_2$O)$_4$—C$_{15}$H$_{31}$, O—(CH$_2$—CH$_2$O)$_5$—C$_{15}$H$_{31}$, O—(CH$_2$—CH$_2$O)$_6$—C$_{15}$H$_{31}$, O—(CH$_2$—CH$_2$O)$_7$—C$_{15}$H$_{31}$, O—(CH(CH$_3$)—CH$_2$O)$_2$—C$_{15}$H$_{31}$, O—(CH(CH$_3$)—CH$_2$O)$_3$—C$_{15}$H$_{31}$,

O—(CH(CH$_3$)—CH$_2$O)$_4$—C$_{15}$H$_{31}$,

O—(CH$_2$—CH$_2$O)$_2$—C$_{16}$H$_{33}$, O—(CH$_2$—CH$_2$O)$_3$—C$_{16}$H$_{33}$,

O—(CH$_2$—CH$_2$O)$_4$—C$_{16}$H$_{33}$, O—(CH$_2$—CH$_2$O)$_5$—C$_{16}$H$_{33}$,

O—(CH$_2$—CH$_2$O)$_6$—C$_{16}$H$_{33}$, O—(CH(CH$_3$)—CH$_2$O)$_2$—C$_{16}$H$_{33}$,

O—(CH(CH$_3$)—CH$_2$O)$_3$—C$_{16}$H$_{33}$, O—(CH(CH$_3$)—CH$_2$O)$_4$—C$_{16}$H$_{33}$,

O—(CH$_2$—CH$_2$O)$_2$—C$_{17}$H$_{35}$, O—(CH$_2$—CH$_2$O)$_3$—C$_{17}$H$_{35}$,

O—(CH$_2$—CH$_2$O)$_4$—C$_{17}$H$_{35}$, O—(CH$_2$—CH$_2$O)$_5$—C$_{17}$H$_{35}$,

O—(CH$_2$—CH$_2$O)$_6$—C$_{17}$H$_{35}$, O—(CH(CH$_3$)—CH$_2$O)$_2$—C$_{17}$H$_{35}$,

O—(CH(CH$_3$)—CH$_2$O)$_3$—C$_{17}$H$_{35}$, O—(CH(CH$_3$)—CH$_2$O)$_4$—C$_{17}$H$_{35}$,

O—(CH$_2$—CH$_2$O)$_2$—C$_{18}$H$_{37}$, O—(CH$_2$—CH$_2$O)$_3$—C$_{18}$H$_{37}$,

O—(CH$_2$—CH$_2$O)$_4$—C$_{18}$H$_{37}$, O—(CH$_2$—CH$_2$O)$_5$—C$_{18}$H$_{37}$,

O—(CH(CH$_3$)—CH$_2$O)$_2$—C$_{18}$H$_{37}$, O—(CH(CH$_3$)—CH$_2$O)$_3$—C$_{18}$H$_{37}$,

O—(CH$_2$—CH$_2$O)$_2$—C$_6$H$_4$—C$_9$H$_{19}$, O—(CH$_2$—CH$_2$O)$_3$—C$_6$H$_4$—C$_9$H$_{19}$,

O—(CH$_2$—CH$_2$O)$_4$—C$_6$H$_4$—C$_9$H$_{19}$, O—(CH$_2$—CH$_2$O)$_5$—C$_6$H$_4$—C$_9$H$_{19}$,

O—(CH$_2$—CH$_2$O)$_6$—C$_6$H$_4$—C$_9$H$_{19}$, O—(CH$_2$—CH$_2$O)$_7$—C$_6$H$_4$—C$_9$H$_{19}$,

O—(CH(CH$_3$)—CH$_2$O)$_2$—C$_6$H$_4$—C$_9$H$_{19}$, O—(CH(CH$_3$)—CH$_2$O)$_3$—C$_6$H$_4$—C$_9$H$_{19}$, O—(CH(CH$_3$)—CH$_2$O)$_4$—C$_6$H$_4$—C$_9$H$_{19}$.

The alkyl polyether group O—(CR$^{II}_2$—CR$^{II}_2$—O)$_t$-Alk can, if t=5, R$^{II}$=H and Alk is C13, be

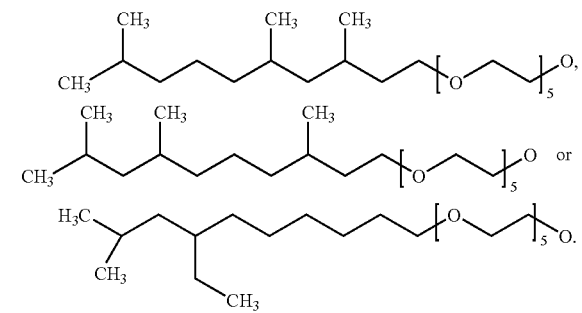

The average branching number of the carbon chain Alk can be from 1 to 5, preferably from 1.2 to 4. The average branching number is defined here as (number of CH$_3$ groups)-1.

Preferred compounds of the general formula I can be:

[[C$_{10}$H$_{21}$O—(CH$_2$—CH$_2$O)$_2$](Me)(EtO)Si(CH$_2$)$_3$]$_2$S$_m$,

[[C$_{10}$H$_{21}$O—(CH$_2$—CH$_2$O)$_3$](Me)(EtO)Si(CH$_2$)$_3$]$_2$S$_m$,

[[C$_{10}$H$_{21}$O—(CH$_2$—CH$_2$O)$_4$](Me)(EtO)Si(CH$_2$)$_3$]$_2$S$_m$,

[[C$_{10}$H$_{21}$O—(CH$_2$—CH$_2$O)$_5$](Me)(EtO)Si(CH$_2$)$_3$]$_2$S$_m$,

[[C$_{10}$H$_{21}$O—(CH$_2$—CH$_2$O)$_6$](Me)(EtO)Si(CH$_2$)$_3$]$_2$S$_m$,

[[C$_{11}$H$_{23}$O—(CH$_2$—CH$_2$O)$_2$](Me)(EtO)Si(CH$_2$)$_3$]$_2$S$_m$,

[[C$_{11}$H$_{23}$O—(CH$_2$—CH$_2$O)$_3$](Me)(EtO)Si(CH$_2$)$_3$]$_2$S$_m$,

[[C$_{11}$H$_{23}$O—(CH$_2$—CH$_2$O)$_4$](Me)(EtO)Si(CH$_2$)$_3$]$_2$S$_m$,

[[C$_{11}$H$_{23}$O—(CH$_2$—CH$_2$O)$_5$](Me)(EtO)Si(CH$_2$)$_3$]$_2$S$_m$,

[[C$_{11}$H$_{23}$O—(CH$_2$—CH$_2$O)$_6$](Me)(EtO)Si(CH$_2$)$_3$]$_2$S$_m$,

[[C$_{12}$H$_{25}$O—(CH$_2$—CH$_2$O)$_2$](Me)(EtO)Si(CH$_2$)$_3$]$_2$μm,

[[C$_{12}$H$_{25}$O—(CH$_2$—CH$_2$O)$_3$](Me)(EtO)Si(CH$_2$)$_3$]$_2$S$_m$,

[[C$_{12}$H$_{25}$O—(CH$_2$—CH$_2$O)$_4$](Me)(EtO)Si(CH$_2$)$_3$]$_2$S$_m$,

[[C$_{12}$H$_{25}$O—(CH$_2$—CH$_2$O)$_5$](Me)(EtO)Si(CH$_2$)$_3$]$_2$S$_m$,

[[C$_{12}$H$_{25}$O—(CH$_2$—CH$_2$O)$_6$](Me)(EtO)Si(CH$_2$)$_3$]$_2$S$_m$,

[[C$_{13}$H$_{27}$O—(CH$_2$—CH$_2$O)$_2$](Me)(EtO)Si(CH$_2$)$_3$]$_2$S$_m$,

[[C$_{13}$H$_{27}$O—(CH$_2$—CH$_2$O)$_3$](Me)(EtO)Si(CH$_2$)$_3$]$_2$S$_m$,

[[C$_{13}$H$_{27}$O—(CH$_2$—CH$_2$O)$_4$](Me)(EtO)Si(CH$_2$)$_3$]$_2$S$_m$,

[[C$_{13}$H$_{27}$O—(CH$_2$—CH$_2$O)$_5$](Me)(EtO)Si(CH$_2$)$_3$]$_2$S$_m$,

[[C$_{13}$H$_{27}$O—(CH$_2$—CH$_2$O)$_6$](Me)(EtO)Si(CH$_2$)$_3$]$_2$S$_m$, $[[C_{14}H_{29}O\text{---}(CH_2\text{---}CH_2O)_2](Me)(EtO)Si(CH_2)_3]_2S_m$,
$[[C_{14}H_{29}O\text{---}(CH_2\text{---}CH_2O)_3](Me)(EtO)Si(CH_2)_3]_2S_m$,
$[[C_{14}H_{29}O\text{---}(CH_2\text{---}CH_2O)_4](Me)(EtO)Si(CH_2)_3]_2S_m$,
$[[C_{14}H_{29}O\text{---}(CH_2\text{---}CH_2O)_5](Me)(EtO)Si(CH_2)_3]_2S_m$,
$[[C_{14}H_{29}O\text{---}(CH_2\text{---}CH_2O)_6](Me)(EtO)Si(CH_2)_3]_2S_m$,
$[[C_{15}H_{31}O\text{---}(CH_2\text{---}CH_2O)_2](Me)(EtO)Si(CH_2)_3]_2S_m$,
$[[C_{15}H_{31}O\text{---}(CH_2\text{---}CH_2O)_3](Me)(EtO)Si(CH_2)_3]_2S_m$,
$[[C_{15}H_{31}O\text{---}(CH_2\text{---}CH_2O)_4](Me)(EtO)Si(CH_2)_3]_2S_m$,
$[[C_{15}H_{31}O\text{---}(CH_2\text{---}CH_2O)_5](Me)(EtO)Si(CH_2)_3]_2S_m$,
$[[C_{15}H_{31}O\text{---}(CH_2\text{---}CH_2O)_6](Me)(EtO)Si(CH_2)_3]_2S_m$,
$[[C_{16}H_{33}O\text{---}(CH_2\text{---}CH_2O)_2](Me)(EtO)Si(CH_2)_3]_2S_m$,
$[[C_{16}H_{33}O\text{---}(CH_2\text{---}CH_2O)_3](Me)(EtO)Si(CH_2)_3]_2S_m$,
$[[C_{16}H_{33}O\text{---}(CH_2\text{---}CH_2O)_4](Me)(EtO)Si(CH_2)_3]_2S_m$,
$[[C_{16}H_{33}O\text{---}(CH_2\text{---}CH_2O)_5](Me)(EtO)Si(CH_2)_3]_2S_m$,
$[[C_{16}H_{33}O\text{---}(CH_2\text{---}CH_2O)_6](Me)(EtO)Si(CH_2)_3]_2S_m$,
$[[C_{17}H_{35}O\text{---}(CH_2\text{---}CH_2O)_2](Me)(EtO)Si(CH_2)_3]_2S_m$,
$[[C_{17}H_{35}O\text{---}(CH_2\text{---}CH_2O)_3](Me)(EtO)Si(CH_2)_3]_2S_m$,
$[[C_{17}H_{35}O\text{---}(CH_2\text{---}CH_2O)_4](Me)(EtO)Si(CH_2)_3]_2S_m$,
$[[C_{17}H_{35}O\text{---}(CH_2\text{---}CH_2O)_5](Me)(EtO)Si(CH_2)_3]_2S_m$,
$[[C_{17}H_{35}O\text{---}(CH_2\text{---}CH_2O)_6](Me)(EtO)Si(CH_2)_3]_2S_m$
$[[C_{18}H_{37}O\text{---}(CH_2\text{---}CH_2O)_2](Me)(EtO)Si(CH_2)_3]_2S_m$,
$[[C_{18}H_{37}O\text{---}(CH_2\text{---}CH_2O)_3](Me)(EtO)Si(CH_2)_3]_2\mu m$,
$[[C_{18}H_{37}O\text{---}(CH_2\text{---}CH_2O)_4](Me)(EtO)Si(CH_2)_3]_2S_m$,
$[[C_{18}H_{37}O\text{---}(CH_2\text{---}CH_2O)_5](Me)(EtO)Si(CH_2)_3]_2S_m$,
$[[C_{10}H_{21}O\text{---}(CH_2\text{---}CH_2O)_2](MeO)_2Si(CH_2)_3]_2S_m$,
$[[C_{10}H_{21}O\text{---}(CH_2\text{---}CH_2O)_3](MeO)_2Si(CH_2)_3]_2S_m$,
$[[C_{10}H_{21}O\text{---}(CH_2\text{---}CH_2O)_4](MeO)_2Si(CH_2)_3]_2S_m$,
$[[C_{10}H_{21}O\text{---}(CH_2\text{---}CH_2O)_5](MeO)_2Si(CH_2)_3]_2S_m$,
$[[C_{10}H_{21}O\text{---}(CH_2\text{---}CH_2O)_6](MeO)_2Si(CH_2)_3]_2S_m$,
$[[C_{11}H_{23}O\text{---}(CH_2\text{---}CH_2O)_2](MeO)_2Si(CH_2)_3]_2S_m$,
$[[C_{11}H_{23}O\text{---}(CH_2\text{---}CH_2O)_3](MeO)_2Si(CH_2)_3]_2S_m$,
$[[C_{11}H_{23}O\text{---}(CH_2\text{---}CH_2O)_4](MeO)_2Si(CH_2)_3]_2S_m$,
$[[C_{11}H_{23}O\text{---}(CH_2\text{---}CH_2O)_5](MeO)_2Si(CH_2)_3]_2S_m$,
$[[C_{11}H_{23}O\text{---}(CH_2\text{---}CH_2O)_6](MeO)_2Si(CH_2)_3]_2S_m$,
$[[C_{12}H_{25}O\text{---}(CH_2\text{---}CH_2O)_2](MeO)_2Si(CH_2)_3]_2S_m$,
$[[C_{12}H_{25}O\text{---}(CH_2\text{---}CH_2O)_3](MeO)_2Si(CH_2)_3]_2S_m$,
$[[C_{12}H_{25}O\text{---}(CH_2\text{---}CH_2O)_4](MeO)_2Si(CH_2)_3]_2S_m$,
$[[C_{12}H_{25}O\text{---}(CH_2\text{---}CH_2O)_5](MeO)_2Si(CH_2)_3]_2S_m$,
$[[C_{12}H_{25}O\text{---}(CH_2\text{---}CH_2O)_6](MeO)_2Si(CH_2)_3]_2S_m$,
$[[C_{13}H_{27}O\text{---}(CH_2\text{---}CH_2O)_2](MeO)_2Si(CH_2)_3]_2S_m$,
$[[C_{13}H_{27}O\text{---}(CH_2\text{---}CH_2O)_3](MeO)_2Si(CH_2)_3]_2S_m$,
$[[C_{13}H_{27}O\text{---}(CH_2\text{---}CH_2O)_4](MeO)_2Si(CH_2)_3]_2S_m$,
$[[C_{13}H_{27}O\text{---}(CH_2\text{---}CH_2O)_5](MeO)_2Si(CH_2)_3]_2S_m$,
$[[C_{13}H_{27}O\text{---}(CH_2\text{---}CH_2O)_6](MeO)_2Si(CH_2)_3]_2S_m$,
$[[C_{14}H_{29}O\text{---}(CH_2\text{---}CH_2O)_2](MeO)_2Si(CH_2)_3]_2S_m$,
$[[C_{14}H_{29}O\text{---}(CH_2\text{---}CH_2O)_3](MeO)_2Si(CH_2)_3]_2S_m$,
$[[C_{14}H_{29}O\text{---}(CH_2\text{---}CH_2O)_4](MeO)_2Si(CH_2)_3]_2S_m$,
$[[C_{14}H_{29}O\text{---}(CH_2\text{---}CH_2O)_5](MeO)_2Si(CH_2)_3]_2S_m$,
$[[C_{14}H_{29}O\text{---}(CH_2\text{---}CH_2O)_6](MeO)_2Si(CH_2)_3]_2S_m$,
$[[C_{16}H_{33}O\text{---}(CH_2\text{---}CH_2O)_2](MeO)_2Si(CH_2)_3]_2S_m$,
$[[C_{16}H_{33}O\text{---}(CH_2\text{---}CH_2O)_3](MeO)_2Si(CH_2)_3]_2S_m$,
$[[C_{16}H_{33}O\text{---}(CH_2\text{---}CH_2O)_4](MeO)_2Si(CH_2)_3]_2S_m$,
$[[C_{16}H_{33}O\text{---}(CH_2\text{---}CH_2O)_5](MeO)_2Si(CH_2)_3]_2S_m$,
$[[C_{16}H_{33}O\text{---}(CH_2\text{---}CH_2O)_6](MeO)_2Si(CH_2)_3]_2S_m$,
$[[C_{18}H_{37}O\text{---}(CH_2\text{---}CH_2O)_2](MeO)_2Si(CH_2)_3]_2S_m$,
$[[C_{18}H_{37}O\text{---}(CH_2\text{---}CH_2O)_3](MeO)_2Si(CH_2)_3]_2S_m$,
$[[C_{18}H_{37}O\text{---}(CH_2\text{---}CH_2O)_4](MeO)_2Si(CH_2)_3]_2S_m$,
$[[C_{18}H_{37}O\text{---}(CH_2\text{---}CH_2O)_5](MeO)_2Si(CH_2)_3]_2S_m$,
$[[C_{12}H_{25}O\text{---}(CH_2\text{---}CH_2O)_2]_2(MeO)Si(CH_2)_3]_2S_m$,
$[[C_{12}H_{25}O\text{---}(CH_2\text{---}CH_2O)_3]_2(MeO)Si(CH_2)_3]_2S_m$,
$[[C_{12}H_{25}O\text{---}(CH_2\text{---}CH_2O)_4]_2(MeO)Si(CH_2)_3]_2S_m$,
$[[C_{12}H_{25}O\text{---}(CH_2\text{---}CH_2O)_5]_2(MeO)Si(CH_2)_3]_2S_m$,
$[[C_{12}H_{25}O\text{---}(CH_2\text{---}CH_2O)_6]_2(MeO)Si(CH_2)_3]_2S_m$,
$[[C_{13}H_{27}O\text{---}(CH_2\text{---}CH_2O)_2]_2(MeO)Si(CH_2)_3]_2S_m$,
$[[C_{13}H_{27}O\text{---}(CH_2\text{---}CH_2O)_3]_2(MeO)Si(CH_2)_3]_2S_m$,
$[[C_{13}H_{27}O\text{---}(CH_2\text{---}CH_2O)_4]_2(MeO)Si(CH_2)_3]_2S_m$,
$[[C_{13}H_{27}O\text{---}(CH_2\text{---}CH_2O)_5]_2(MeO)Si(CH_2)_3]_2S_m$,
$[[C_{13}H_{27}O\text{---}(CH_2\text{---}CH_2O)_6]_2(MeO)Si(CH_2)_3]_2S_m$,
$[[C_{14}H_{29}O\text{---}(CH_2\text{---}CH_2O)_2]_2(MeO)Si(CH_2)_3]_2S_m$,
$[[C_{14}H_{29}O\text{---}(CH_2\text{---}CH_2O)_3]_2(MeO)Si(CH_2)_3]_2S_m$,
$[[C_{14}H_{29}O\text{---}(CH_2\text{---}CH_2O)_4]_2(MeO)Si(CH_2)_3]_2S_m$,
$[[C_{14}H_{29}O\text{---}(CH_2\text{---}CH_2O)_5]_2(MeO)Si(CH_2)_3]_2S_m$,
$[[C_{14}H_{29}O\text{---}(CH_2\text{---}CH_2O)_6]_2(MeO)Si(CH_2)_3]_2S_m$,
$[[C_{16}H_{33}O\text{---}(CH_2\text{---}CH_2O)_2]_2(MeO)Si(CH_2)_3]_2S_m$,
$[[C_{16}H_{33}O\text{---}(CH_2\text{---}CH_2O)_3]_2(MeO)Si(CH_2)_3]_2S_m$,
$[[C_{16}H_{33}O\text{---}(CH_2\text{---}CH_2O)_4]_2(MeO)Si(CH_2)_3]_2S_m$,
$[[C_{16}H_{33}O\text{---}(CH_2\text{---}CH_2O)_5]_2(MeO)Si(CH_2)_3]_2S_m$,
$[[C_{16}H_{33}O\text{---}(CH_2\text{---}CH_2O)_6]_2(MeO)Si(CH_2)_3]_2S_m$,
$[[C_{18}H_{37}O\text{---}(CH_2\text{---}CH_2O)_2]_2(MeO)Si(CH_2)_3]_2S_m$,
$[[C_{18}H_{37}O\text{---}(CH_2\text{---}CH_2O)_3]_2(MeO)Si(CH_2)_3]_2S_m$,
$[[C_{18}H_{37}O\text{---}(CH_2\text{---}CH_2O)_4]_2(MeO)Si(CH_2)_3]_2S_m$,
$[[C_{18}H_{37}O\text{---}(CH_2\text{---}CH_2O)_5]_2(MeO)Si(CH_2)_3]_2S_m$,
$[[C_{10}H_{21}O\text{---}(CH_2\text{---}CH_2O)_2](EtO)_2Si(CH_2)_3]_2S_m$,
$[[C_{10}H_{21}O\text{---}(CH_2\text{---}CH_2O)_3](EtO)_2Si(CH_2)_3]_2S_m$,
$[[C_{10}H_{21}O\text{---}(CH_2\text{---}CH_2O)_4](EtO)_2Si(CH_2)_3]_2S_m$,
$[[C_{10}H_{21}O\text{---}(CH_2\text{---}CH_2O)_5](EtO)_2Si(CH_2)_3]_2S_m$,
$[[C_{10}H_{21}O\text{---}(CH_2\text{---}CH_2O)_6](EtO)_2Si(CH_2)_3]_2S_m$,
$[[C_{11}H_{23}O\text{---}(CH_2\text{---}CH_2O)_2](EtO)_2Si(CH_2)_3]_2S_m$,
$[[C_{11}H_{23}O\text{---}(CH_2\text{---}CH_2O)_3](EtO)_2Si(CH_2)_3]_2S_m$,
$[[C_{11}H_{23}O\text{---}(CH_2\text{---}CH_2O)_4](EtO)_2Si(CH_2)_3]_2S_m$,

[[C$_{11}$H$_{23}$O—(CH$_2$—CH$_2$O)$_5$](EtO)$_2$Si(CH$_2$)$_3$]$_2$S$_m$,
[[C$_{11}$H$_{23}$O—(CH$_2$—CH$_2$O)$_6$](EtO)$_2$Si(CH$_2$)$_3$]$_2$S$_m$,
[[C$_{12}$H$_{25}$O—(CH$_2$—CH$_2$O)$_2$](EtO)$_2$Si(CH$_2$)$_3$]$_2$S$_m$,
[[C$_{12}$H$_{25}$O—(CH$_2$—CH$_2$O)$_3$](EtO)$_2$Si(CH$_2$)$_3$]$_2$S$_m$,
[[C$_{12}$H$_{25}$O—(CH$_2$—CH$_2$O)$_4$](EtO)$_2$Si(CH$_2$)$_3$]$_2$S$_m$,
[[C$_{12}$H$_{25}$O—(CH$_2$—CH$_2$O)$_5$](EtO)$_2$Si(CH$_2$)$_3$]$_2$S$_m$,
[[C$_{12}$H$_{25}$O—(CH$_2$—CH$_2$O)$_6$](EtO)$_2$Si(CH$_2$)$_3$]$_2$S$_m$,
[[C$_{13}$H$_{27}$O—(CH$_2$—CH$_2$O)$_2$](EtO)$_2$Si(CH$_2$)$_3$]$_2$S$_m$,
[[C$_{13}$H$_{27}$O—(CH$_2$—CH$_2$O)$_3$](EtO)$_2$Si(CH$_2$)$_3$]$_2$S$_m$,
[[C$_{13}$H$_{27}$O—(CH$_2$—CH$_2$O)$_4$](EtO)$_2$Si(CH$_2$)$_3$]$_2$S$_m$,
[[C$_{13}$H$_{27}$O—(CH$_2$—CH$_2$O)$_5$](EtO)$_2$Si(CH$_2$)$_3$]$_2$S$_m$,
[[C$_{13}$H$_{27}$O—(CH$_2$—CH$_2$O)$_6$](EtO)$_2$Si(CH$_2$)$_3$]$_2$S$_m$,
[[C$_{14}$H$_{29}$O—(CH$_2$—CH$_2$O)$_2$](EtO)$_2$Si(CH$_2$)$_3$]$_2$S$_m$,
[[C$_{14}$H$_{29}$O—(CH$_2$—CH$_2$O)$_3$](EtO)$_2$Si(CH$_2$)$_3$]$_2$S$_m$,
[[C$_{14}$H$_{29}$O—(CH$_2$—CH$_2$O)$_4$](EtO)$_2$Si(CH$_2$)$_3$]$_2$S$_m$,
[[C$_{14}$H$_{29}$O—(CH$_2$—CH$_2$O)$_5$](EtO)$_2$Si(CH$_2$)$_3$]$_2$S$_m$,
[[C$_{14}$H$_{29}$O—(CH$_2$—CH$_2$O)$_6$](EtO)$_2$Si(CH$_2$)$_3$]$_2$S$_m$,
[[C$_{16}$H$_{33}$O—(CH$_2$—CH$_2$O)$_2$](EtO)$_2$Si(CH$_2$)$_3$]$_2$S$_m$,
[[C$_{16}$H$_{33}$O—(CH$_2$—CH$_2$O)$_3$](EtO)$_2$Si(CH$_2$)$_3$]$_2$S$_m$,
[[C$_{16}$H$_{33}$O—(CH$_2$—CH$_2$O)$_4$](EtO)$_2$Si(CH$_2$)$_3$]$_2$S$_m$,
[[C$_{16}$H$_{33}$O—(CH$_2$—CH$_2$O)$_5$](EtO)$_2$Si(CH$_2$)$_3$]$_2$S$_m$,
[[C$_{16}$H$_{33}$O—(CH$_2$—CH$_2$O)$_6$](EtO)$_2$Si(CH$_2$)$_3$]$_2$S$_m$,
[[C$_{17}$H$_{35}$O—(CH$_2$—CH$_2$O)$_2$](EtO)$_2$Si(CH$_2$)$_3$]$_2$S$_m$,
[[C$_{17}$H$_{35}$O—(CH$_2$—CH$_2$O)$_3$](EtO)$_2$Si(CH$_2$)$_3$]$_2$S$_m$,
[[C$_{17}$H$_{35}$O—(CH$_2$—CH$_2$O)$_4$](EtO)$_2$Si(CH$_2$)$_3$]$_2$S$_m$,
[[C$_{17}$H$_{35}$O—(CH$_2$—CH$_2$O)$_5$](EtO)$_2$Si(CH$_2$)$_3$]$_2$S$_m$,
[[C$_{17}$H$_{35}$O—(CH$_2$—CH$_2$O)$_6$](EtO)$_2$Si(CH$_2$)$_3$]$_2$S$_m$,
[[C$_{18}$H$_{37}$O—(CH$_2$—CH$_2$O)$_2$](EtO)$_2$Si(CH$_2$)$_3$]$_2$S$_m$,
[[C$_{18}$H$_{37}$O—(CH$_2$—CH$_2$O)$_3$](EtO)$_2$Si(CH$_2$)$_3$]$_2$S$_m$,
[[C$_{18}$H$_{37}$O—(CH$_2$—CH$_2$O)$_4$](EtO)$_2$Si(CH$_2$)$_3$]$_2$S$_m$,
[[C$_{18}$H$_{37}$O—(CH$_2$—CH$_2$O)$_5$](EtO)$_2$Si(CH$_2$)$_3$]$_2$S$_m$,
[[C$_{12}$H$_{25}$O—(CH$_2$—CH$_2$O)$_2$]$_2$(EtO)Si(CH$_2$)$_3$]$_2$S$_m$,
[[C$_{12}$H$_{25}$O—(CH$_2$—CH$_2$O)$_3$]$_2$(EtO)Si(CH$_2$)$_3$]$_2$S$_m$,
[[C$_{12}$H$_{25}$O—(CH$_2$—CH$_2$O)$_4$]$_2$(EtO)Si(CH$_2$)$_3$]$_2$S$_m$,
[[C$_{12}$H$_{25}$O—(CH$_2$—CH$_2$O)$_5$]$_2$(EtO)Si(CH$_2$)$_3$]$_2$S$_m$,
[[C$_{12}$H$_{25}$O—(CH$_2$—CH$_2$O)$_6$]$_2$(EtO)Si(CH$_2$)$_3$]$_2$S$_m$,
[[C$_{13}$H$_{27}$O—(CH$_2$—CH$_2$O)$_2$]$_2$(EtO)Si(CH$_2$)$_3$]$_2$S$_m$,
[[C$_{13}$H$_{27}$O—(CH$_2$—CH$_2$O)$_3$]$_2$(EtO)Si(CH$_2$)$_3$]$_2$S$_m$,
[[C$_{13}$H$_{27}$O—(CH$_2$—CH$_2$O)$_4$]$_2$(EtO)Si(CH$_2$)$_3$]$_2$S$_m$,
[[C$_{13}$H$_{27}$O—(CH$_2$—CH$_2$O)$_5$]$_2$(EtO)Si(CH$_2$)$_3$]$_2$S$_m$,
[[C$_{13}$H$_{27}$O—(CH$_2$—CH$_2$O)$_6$]$_2$(EtO)Si(CH$_2$)$_3$]$_2$S$_m$,
[[C$_{14}$H$_{29}$O—(CH$_2$—CH$_2$O)$_2$]$_2$(EtO)Si(CH$_2$)$_3$]$_2$S$_m$,
[[C$_{14}$H$_{29}$O—(CH$_2$—CH$_2$O)$_3$]$_2$(EtO)Si(CH$_2$)$_3$]$_2$S$_m$,
[[C$_{14}$H$_{29}$O—(CH$_2$—CH$_2$O)$_4$]$_2$(EtO)Si(CH$_2$)$_3$]$_2$S$_m$,
[[C$_{14}$H$_{29}$O—(CH$_2$—CH$_2$O)$_5$]$_2$(EtO)Si(CH$_2$)$_3$]$_2$S$_m$,
[[C$_{14}$H$_{29}$O—(CH$_2$—CH$_2$O)$_6$]$_2$(EtO)Si(CH$_2$)$_3$]$_2$S$_m$,
[[C$_{16}$H$_{33}$O—(CH$_2$—CH$_2$O)$_2$]$_2$(EtO)Si(CH$_2$)$_3$]$_2$S$_m$,
[[C$_{16}$H$_{33}$O—(CH$_2$—CH$_2$O)$_3$]$_2$(EtO)Si(CH$_2$)$_3$]$_2$S$_m$,
[[C$_{16}$H$_{33}$O—(CH$_2$—CH$_2$O)$_4$]$_2$(EtO)Si(CH$_2$)$_3$]$_2$S$_m$,
[[C$_{16}$H$_{33}$O—(CH$_2$—CH$_2$O)$_5$]$_2$(EtO)Si(CH$_2$)$_3$]$_2$S$_m$,
[[C$_{16}$H$_{33}$O—(CH$_2$—CH$_2$O)$_6$]$_2$(EtO)Si(CH$_2$)$_3$]$_2$S$_m$,
[[C$_{17}$H$_{35}$O—(CH$_2$—CH$_2$O)$_2$]$_2$(EtO)Si(CH$_2$)$_3$]$_2$S$_m$,
[[C$_{17}$H$_{35}$O—(CH$_2$—CH$_2$O)$_3$]$_2$(EtO)Si(CH$_2$)$_3$]$_2$S$_m$,
[[C$_{17}$H$_{35}$O—(CH$_2$—CH$_2$O)$_4$]$_2$(EtO)Si(CH$_2$)$_3$]$_2$S$_m$,
[[C$_{17}$H$_{35}$O—(CH$_2$—CH$_2$O)$_5$]$_2$(EtO)Si(CH$_2$)$_3$]$_2$S$_m$,
[[C$_{17}$H$_{35}$O—(CH$_2$—CH$_2$O)$_6$]$_2$(EtO)Si(CH$_2$)$_3$]$_2$S$_m$,
[[C$_{18}$H$_{37}$O—(CH$_2$—CH$_2$O)$_2$]$_2$(EtO)Si(CH$_2$)$_3$]$_2$S$_m$,
[[C$_{18}$H$_{37}$O—(CH$_2$—CH$_2$O)$_3$]$_2$(EtO)Si(CH$_2$)$_3$]$_2$S$_m$,
[[C$_{18}$H$_{37}$O—(CH$_2$—CH$_2$O)$_4$]$_2$(EtO)Si(CH$_2$)$_3$]$_2$S$_m$,
[[C$_{18}$H$_{37}$O—(CH$_2$—CH$_2$O)$_5$]$_2$(EtO)Si(CH$_2$)$_3$]$_2$S$_m$,
[[C$_{10}$H$_{21}$O—(CH$_2$—CH$_2$O)$_2$]$_3$Si(CH$_2$)$_3$]$_2$S$_m$,
[[C$_{10}$H$_{21}$O—(CH$_2$—CH$_2$O)$_3$]$_3$Si(CH$_2$)$_3$]$_2$S$_m$,
[[C$_{10}$H$_{21}$O—(CH$_2$—CH$_2$O)$_4$]$_3$Si(CH$_2$)$_3$]$_2$S$_m$,
[[C$_{10}$H$_{21}$O—(CH$_2$—CH$_2$O)$_5$]$_3$Si(CH$_2$)$_3$]$_2$S$_m$,
[[C$_{10}$H$_{21}$O—(CH$_2$—CH$_2$O)$_6$]$_3$Si(CH$_2$)$_3$]$_2$S$_m$,
[[C$_{12}$H$_{25}$O—(CH$_2$—CH$_2$O)$_2$]$_3$Si(CH$_2$)$_3$]$_2$S$_m$,
[[C$_{12}$H$_{25}$O—(CH$_2$—CH$_2$O)$_3$]$_3$Si(CH$_2$)$_3$]$_2$S$_m$,
[[C$_{12}$H$_{25}$O—(CH$_2$—CH$_2$O)$_4$]$_3$Si(CH$_2$)$_3$]$_2$S$_m$,
[[C$_{12}$H$_{25}$O—(CH$_2$—CH$_2$O)$_5$]$_3$Si(CH$_2$)$_3$]$_2$S$_m$,
[[C$_{12}$H$_{25}$O—(CH$_2$—CH$_2$O)$_6$]$_3$Si(CH$_2$)$_3$]$_2$S$_m$,
[[C$_{13}$H$_{27}$O—(CH$_2$—CH$_2$O)$_2$]$_3$Si(CH$_2$)$_3$]$_2$S$_m$,
[[C$_{13}$H$_{27}$O—(CH$_2$—CH$_2$O)$_3$]$_3$Si(CH$_2$)$_3$]$_2$S$_m$,
[[C$_{13}$H$_{27}$O—(CH$_2$—CH$_2$O)$_4$]$_3$Si(CH$_2$)$_3$]$_2$S$_m$,
[[C$_{13}$H$_{27}$O—(CH$_2$—CH$_2$O)$_5$]$_3$Si(CH$_2$)$_3$]$_2$S$_m$,
[[C$_{13}$H$_{27}$O—(CH$_2$—CH$_2$O)$_6$]$_3$Si(CH$_2$)$_3$]$_2$S$_m$,
[[C$_{14}$H$_{29}$O—(CH$_2$—CH$_2$O)$_2$]$_3$Si(CH$_2$)$_3$]$_2$S$_m$,
[[C$_{14}$H$_{29}$O—(CH$_2$—CH$_2$O)$_3$]$_3$Si(CH$_2$)$_3$]$_2$S$_m$,
[[C$_{14}$H$_{29}$O—(CH$_2$—CH$_2$O)$_4$]$_3$Si(CH$_2$)$_3$]$_2$S$_m$,
[[C$_{14}$H$_{29}$O—(CH$_2$—CH$_2$O)$_5$]$_3$Si(CH$_2$)$_3$]$_2$S$_m$,
[[C$_{14}$H$_{29}$O—(CH$_2$—CH$_2$O)$_6$]$_3$Si(CH$_2$)$_3$]$_2$S$_m$,
[[C$_{15}$H$_{31}$O—(CH$_2$—CH$_2$O)$_2$]$_3$Si(CH$_2$)$_3$]$_2$S$_m$,
[[C$_{15}$H$_{31}$O—(CH$_2$—CH$_2$O)$_3$]$_3$Si(CH$_2$)$_3$]$_2$S$_m$,
[[C$_{15}$H$_{31}$O—(CH$_2$—CH$_2$O)$_4$]$_3$Si(CH$_2$)$_3$]$_2$S$_m$,
[[C$_{15}$H$_{31}$O—(CH$_2$—CH$_2$O)$_5$]$_3$Si(CH$_2$)$_3$]$_2$S$_m$,
[[C$_{15}$H$_{31}$O—(CH$_2$—CH$_2$O)$_6$]$_3$Si(CH$_2$)$_3$]$_2$S$_m$,
[[C$_{16}$H$_{33}$O—(CH$_2$—CH$_2$O)$_2$]$_3$Si(CH$_2$)$_3$]$_2$S$_m$,
[[C$_{16}$H$_{33}$O—(CH$_2$—CH$_2$O)$_3$]$_3$Si(CH$_2$)$_3$]$_2$S$_m$,
[[C$_{16}$H$_{33}$O—(CH$_2$—CH$_2$O)$_4$]$_3$Si(CH$_2$)$_3$]$_2$S$_m$,
[[C$_{16}$H$_{33}$O—(CH$_2$—CH$_2$O)$_5$]$_3$Si(CH$_2$)$_3$]$_2$S$_m$,
[[C$_{16}$H$_{33}$O—(CH$_2$—CH$_2$O)$_6$]$_3$Si(CH$_2$)$_3$]$_2$S$_m$, $[[C_{18}H_{37}O-(CH_2-CH_2O)_2]_3Si(CH_2)_3]_2S_m$, $[[C_{18}H_{37}O-(CH_2-CH_2O)_3]_3Si(CH_2)_3]_2S_m$, $[[C_{18}H_{37}O-(CH_2-CH_2O)_4]_3Si(CH_2)_3]_2S_m$ or $[[C_{18}H_{37}O-(CH_2-CH_2O)_5]_3Si(CH_2)_3]_2S_m$, where the alkyl radicals can be unbranched or branched.

Compounds of the formula I where Alk=$C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$ or $C_{20}H_{41}$ can be:

$[[Alk-O-(CH_2-CH(CH_3)O-)_2](MeO)_2Si(CH_2)_3]_2S_m$, $[[Alk-O-(CH_2-CH(CH_3)O-)_3](MeO)_2Si(CH_2)_3]_2S_m$, $[[Alk-O-(CH_2-CH(CH_3)O-)_4](MeO)_2Si(CH_2)_3]_2S_m$, $[[Alk-O-(CH_2-CH(CH_3)O-)_5](MeO)_2Si(CH_2)_3]_2S_m$, $[[Alk-O-(CH_2-CH(CH_3)O-)_6](MeO)_2Si(CH_2)_3]_2S_m$, $[[Alk-O-(CH_2-CH(CH_3)O-)_2]_2(MeO)Si(CH_2)_3]_2S_m$, $[[Alk-O-(CH_2-CH(CH_3)O-)_3]_2(MeO)Si(CH_2)_3]_2S_m$, $[[Alk-O-(CH_2-CH(CH_3)O-)_4]_2(MeO)Si(CH_2)_3]_2S_m$, $[[Alk-O-(CH_2-CH(CH_3)O-)_5]_2(MeO)Si(CH_2)_3]_2S_m$, $[[Alk-O-(CH_2-CH(CH_3)O-)_6]_2(MeO)Si(CH_2)_3]_2S_m$, $[[Alk-O-(CH_2-CH(CH_3)O-)_2](Me)(MeO)Si(CH_2)_3]_2S_m$, $[[Alk-O-(CH_2-CH(CH_3)O-)_3](Me)(MeO)Si(CH_2)_3]_2S_m$, $[[Alk-O-(CH_2-CH(CH_3)O-)_4](Me)(MeO)Si(CH_2)_3]_2S_m$, $[[Alk-O-(CH_2-CH(CH_3)O-)_5](Me)(MeO)Si(CH_2)_3]_2S_m$, $[[Alk-O-(CH_2-CH(CH_3)O-)_6](Me)(MeO)Si(CH_2)_3]_2S_m$, $[[Alk-O-(CH_2-CH(CH_3)O-)_2](EtO)_2Si(CH_2)_3]_2S_m$, $[[Alk-O-(CH_2-CH(CH_3)O-)_3](EtO)_2Si(CH_2)_3]_2S_m$, $[[Alk-O-(CH_2-CH(CH_3)O-)_4](EtO)_2Si(CH_2)_3]_2S_m$, $[[Alk-O-(CH_2-CH(CH_3)O-)_5](EtO)_2Si(CH_2)_3]_2S_m$, $[[Alk-O-(CH_2-CH(CH_3)O-)_6](EtO)_2Si(CH_2)_3]_2S_m$, $[[Alk-O-(CH_2-CH(CH_3)O-)_2]_2(EtO)Si(CH_2)_3]_2S_m$, $[[Alk-O-(CH_2-CH(CH_3)O-)_3]_2(EtO)Si(CH_2)_3]_2S_m$, $[[Alk-O-(CH_2-CH(CH_3)O-)_4]_2(EtO)Si(CH_2)_3]_2S_m$, $[[Alk-O-(CH_2-CH(CH_3)O-)_5]_2(EtO)Si(CH_2)_3]_2S_m$, $[[Alk-O-(CH_2-CH(CH_3)O-)_6]_2(EtO)Si(CH_2)_3]_2S_m$, $[[Alk-O-(CH_2-CH(CH_3)O-)_2](Me)(EtO)Si(CH_2)_3]_2S_m$, $[[Alk-O-(CH_2-CH(CH_3)O-)_3](Me)(EtO)Si(CH_2)_3]_2S_m$, $[[Alk-O-(CH_2-CH(CH_3)O-)_4](Me)(EtO)Si(CH_2)_3]_2S_m$, $[[Alk-O-(CH_2-CH(CH_3)O-)_5](Me)(EtO)Si(CH_2)_3]_2S_m$, $[[Alk-O-(CH_2-CH(CH_3)O-)_6](Me)(EtO)Si(CH_2)_3]_2S_m$, $[[Alk-O-(CH_2-CH(CH_3)O-)_2]_2(Me)Si(CH_2)_3]_2S_m$, $[[Alk-O-(CH_2-CH(CH_3)O-)_3]_2(Me)Si(CH_2)_3]_2S_m$, $[[Alk-O-(CH_2-CH(CH_3)O-)_4]_2(Me)Si(CH_2)_3]_2S_m$, $[[Alk-O-(CH_2-CH(CH_3)O-)_5]_2(Me)Si(CH_2)_3]_2S_m$, $[[Alk-O-(CH_2-CH(CH_3)O-)_6]_2(Me)Si(CH_2)_3]_2S_m$, $[[Alk-O-(CH_2-CH(CH_3)O-)_2](Me)_2Si(CH_2)_3]_2S_m$, $[[Alk-O-(CH_2-CH(CH_3)O-)_3](Me)_2Si(CH_2)_3]_2S_m$, $[[Alk-O-(CH_2-CH(CH_3)O-)_4](Me)_2Si(CH_2)_3]_2S_m$, $[[Alk-O-(CH_2-CH(CH_3)O-)_5](Me)_2Si(CH_2)_3]_2S_m$ or $[[Alk-O-(CH_2-CH(CH_3)O-)_6](Me)_2Si(CH_2)_3]_2S_m$, where the Alk groups can be unbranched or branched and the alkyl polyether group X has from 14 to 29 carbon atoms.

The polysulphidic organo(alkyl polyether silanes) of the general formula I can be a mixture composed of polysulphidic organo(alkyl polyether silanes) of the general formula I.

The polysulphidic organo(alkyl polyether silanes) of the general formula I can be a mixture composed of polysulphidic organo(alkyl polyether silanes) of the general formula I, where X, X' and X" in the compounds are alkoxy and alkyl polyether groups.

The polysulphidic organo(alkyl polyether silanes) of the general formula I can be a mixture composed of polysulphidic organo(alkyl polyether silanes) of the general formula I, where the compounds have different t and w.

The polysulphidic organo(alkyl polyether silanes) of the general formula I can be a mixture composed of polysulphidic organo(alkyl polyether silanes) of the general formula I, where Alk in the compounds has a different number of carbon atoms and/or is branched.

The polysulphidic organo(alkyl polyether silanes) of the general formula I can be a mixture composed of polysulphidic organo(alkyl polyether silanes) of the general formula I, where the compounds comprise more than 5% by weight, preferably more than 10% by weight, particularly preferably more than 25% by weight, very particularly preferably more than 50% by weight, of compounds where m=2.

Condensates, i.e. oligo- and polysiloxanes, can easily be formed from the polysulphidic organo(alkyl polyether silanes) of the formula I via water addition and, if appropriate, addition of additives.

These oligomeric or polymeric siloxanes of the compounds of the formula I can be used as coupling reagents for applications the same as those for which the monomeric compounds of the formula I can be used.

The polysulphidic organo(alkyl polyether silanes) can take the form of a mixture of the oligomeric or polymeric siloxanes of polysulphidic organo(alkyl polyether silanes) of the general formula I or of mixtures of polysulphidic organo(alkyl polyether silanes) of the general formula I with mixtures of the oligomeric or polymeric siloxanes of polysulphidic organo(alkyl polyether silanes) of the general formula I.

The polysulphidic organo(alkyl polyether silanes) can be described analytically by means of high-resolution $^1H$, $^{29}Si$, or $^{13}C$ NMR, GPC or high-resolution mass spectroscopy.

The polysulphidic organo(alkyl polyether silanes) can preferably be described analytically by means of high-resolution $^{13}C$ NMR.

The polysulphidic organo(alkyl polyether silanes) can be described and characterized by DSC (Difference Scanning Calorimetry) via their melting range.

The mixtures of substances obtained with respect to the relative distribution of the alkoxy substituents in relation to one another can be determined via $^{13}C$ and $^{29}Si$ nuclear magnetic resonance spectroscopy.

The mixtures of substances obtained with respect to the relative distribution of the alkoxy substituents in relation to one another can be determined via total hydrolysis of the inventive alkoxysilanes and subsequent gas-chromatographic analysis.

The mixtures of substances obtained with respect to the relative distribution of the alkoxy substituents in relation to one another can be determined via total hydrolysis of the inventive alkoxysilanes and subsequent HPLC analysis.

DETAILED DESCRIPTION OF INVENTION

The polysulphidic organo(alkyl polyether silanes) of the general formula I can be prepared by taking silanes of the general formula II

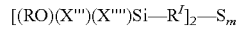

where $R^I$ and m are as defined above and (RO) is branched or unbranched alkoxy, preferably C1-C25 alkoxy, particularly preferably C1-C18 alkoxy, particularly preferably O—$CH_3$, O—$CH_2$—$CH_3$, O—$CH_2$—$CH_2$—$CH_3$, O—$CH(CH_3)_2$, O—$C_8H_{17}$, O—$C_9H_{19}$, O—$C_{10}H_{21}$, O—$C_{11}H_{23}$, O—$C_{12}H_{25}$, O—$C_{13}H_{27}$, O—$C_{14}H_{29}$, O—$C_{15}H_{31}$, O—$C_{16}H_{33}$, O—$C_{17}H_{35}$, O—$C_{18}H_{37}$, X''' is branched or unbranched alkyl, preferably $C_1$-$C_{18}$ alkyl, particularly preferably $CH_3$, $CH_2$—$CH_3$, $CH(CH_3)$—$CH_3$, $CH_2$—$CH_2$—$CH_3$ or $C_4$-$C_{15}$-alkyl, branched or unbranched alkoxy, preferably $C_1$-$C_{18}$ alkoxy, particularly preferably —$OCH_3$, —$OCH_2$—$CH_3$, —$OCH(CH_3)$—$CH_3$, —$OCH_2$—$CH_2$—$CH_3$, —$OC_{12}H_{25}$, —$OC_{13}H_{27}$, $OC_{14}H_{29}$ or $C_{15}$-$C_{18}$ alkoxy, branched or unbranched $C_2$-$C_{25}$ alkenyloxy, preferably $C_4$-$C_{20}$ alkenyloxy, particularly preferably $C_6$-$C_{18}$ alkenyloxy, $C_6$-$C_{35}$ aryloxy, preferably $C_9$-$C_{30}$ aryloxy, particularly preferably phenyloxy (—$OC_6H_5$) or $C_9$-$C_{18}$ aryloxy, a branched or unbranched $C_7$-$C_{35}$ alkylaryloxy group, preferably $C_9$-$C_{30}$ alkylaryloxy group, particularly preferably benzyloxy (—O—$CH_2$—$C_6H_5$) or —O—$CH_2$—$CH_2$—$C_6H_5$, a branched or unbranched $C_7$-$C_{35}$ aralkyloxy group, preferably $C_9$-$C_{25}$ aralkyloxy group, particularly preferably tolyloxy (—O—$C_6H_4$—$CH_3$) or a $C_9$-$C_{18}$ aralkyloxy group, or (RO), X'''' is branched or unbranched alkyl, preferably $C_1$-$C_{18}$ alkyl, particularly preferably $CH_3$, $CH_2$—$CH_3$, $CH(CH_3)$—$CH_3$, $CH_2$—$CH_2$—$CH_3$ or $C_4$-$C_{15}$-alkyl, branched or unbranched alkoxy, preferably $C_1$-$C_{18}$ alkoxy, particularly preferably —$OCH_3$, —$OCH_2$—$CH_3$, —$OCH(CH_3)$—$CH_3$, —$OCH_2$—$CH_2$—$CH_3$ or $C_4$-$C_{15}$ alkoxy, $C_2$-$C_{25}$ alkenyloxy, preferably $C_4$-$C_{20}$ alkenyloxy, particularly preferably $C_6$-$C_{18}$ alkenyloxy, $C_6$-$C_{35}$ aryloxy, preferably $C_9$-$C_{30}$ aryloxy, particularly preferably phenyloxy (—$OC_6H_5$) or $C_9$-$C_{18}$ aryloxy, a branched or unbranched $C_7$-$C_{35}$ alkylaryloxy group, preferably $C_9$-$C_{30}$ alkylaryloxy group, particularly preferably benzyloxy (—O—$CH_2$—$C_6H_5$) or —O—$CH_2$—$CH_2$—$C_6H_5$, a branched or unbranched $C_7$-$C_{35}$ aralkyloxy group, preferably $C_9$-$C_{25}$ aralkyloxy group, particularly preferably tolyloxy (—O—$C_6H_4$—$CH_3$) or a $C_9$-$C_{18}$ aralkyloxy group, or (RO), and reacting them, with or without catalysis, with an alkoxylated alcohol HO—$((CR^{II}_2)_w$—O—$)_t$ Alk with elimination of R—OH, and continuous or batchwise removal of R—OH from the reaction mixture.

The alkoxylated alcohol HO—$((CR^{II}_2)_w$—O—$)_t$ Alk can be an ethoxylated alcohol.

The alkoxylated alcohol HO—$((CR^{II}_2)_w$—O—$)_t$ Alk can be a propoxylated alcohol.

The molar ratio of the alkoxylated alcohol HO—$((CR^{II}_2)_w$—O—$)_t$ Alk to the silane of the general formula II can be from 0.01 to 8, preferably 0.1 to 6.5, particularly preferably from 0.5 to 6, very particularly preferably from 0.5 to 4.

The bis(alkoxysilylorganyl)polysulphides of the general formula II used as starting material can be a mixture composed of various bis(alkoxysilylorganyl)polysulphides having from —$S_1$— to —$S_{12}$— (m=from 1 to 12) or can be a pure bis(alkoxysilylorganyl)poly-sulphide, where m is from 2 to 12.

The bis(alkoxysilylorganyl)polysulphides used of the general formula II can comprise compounds or mixtures of compounds having an average sulphur chain length of from 2.0 to 4.0. The average sulphur chain length for bis(alkoxysilylorganyl)polysulphides can be determined as arithmetic average of $S_2$ to $S_{12}$, measured by HPLC.

The amount of compounds where m=1 present in the bis (alkoxysilylorganyl)polysulphides of the general formula II used as starting material can be from 0.01 to 20% by weight, preferably from 0.1 to 15% by weight, particularly preferably from 0.1 to 10% by weight, very particularly preferably from 1 to 8% by weight.

The following process can be used to obtain oligo- and polysiloxanes of the compounds of the general formula I:

oligomerization or co-oligomerization of the corresponding alkoxysilane compounds of the general formula II via water addition and via additive addition known to the person skilled in the art in this field and then exchange of individual (RO—) in the oligomers or co-oligomers for alkoxylated alcohols HO—$((CR^{II}_2)_w$—O—$)_t$ Alk by means of continuous or batchwise, catalysed or uncatalysed transesterification.

The alkoxylated alcohols HO—$((CR^{II}_2)_w$—O—$)_t$ Alk used for the transesterification reaction can be used either in the form of mixtures of different alcohols or else in the form of pure substances. Examples of alkoxylated alcohols HO—$((CR^{II}_2)_w$—O—$)_t$ Alk that can be used are branched or linear alcohols which have been ethoxylated/propoxylated or, respectively, contain ethylene oxide units and contain propylene oxide units.

The alkoxylated alcohols used can have the formula

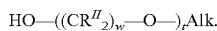

The compounds used as catalysts for the transesterification reaction can be metal-containing or metal-free. EP 1394167 describes suitable catalysts.

The reaction can be carried out at temperatures of from 20 to 200° C., preferably from 50 to 170° C., particularly preferably from 80 to 150° C. To avoid condensation reactions, it can be advantageous to carry out the reaction in an anhydrous environment, ideally in an inert gas atmosphere.

The reaction can be carried out at atmospheric pressure or at reduced pressure. The reaction can be carried out continuously or batchwise.

The organo(alkyl polyether silanes) of the formula I can be used as coupling agents between inorganic materials (e.g. glass beads, crushed glass, glass surfaces, glass fibres, metals, oxidic fillers, silicas) and organic polymers (e.g. thermosets, thermoplastics, elastomers) or as crosslinking agents and surface modifiers for oxidic surfaces. The organo(alkyl polyether silanes) of the formula I can be used as coupling reagents in filled rubber mixtures, e.g. tyre treads.

The styrene-butadiene rubber (SBR) used can comprise styrene-butadiene copolymers, such as emulsion SBR (E-SBR) or solution SBR (S-SBR). The styrene-butadiene copolymers can have styrene content of from 1 to 60% by weight, preferably from 2 to 50% by weight, particularly preferably from 10 to 40% by weight, very particularly preferably from 15 to 35% by weight. For production of car tyre treads, anionically polymerized S-SBR rubbers (solution SBR) whose glass transition temperature is above −50° C., and also mixtures of these with diene rubbers, can in particular be used. S-SBR rubbers whose butadiene portion has a vinyl content of above 20% by weight can be used with particular preference. S-SBR rubbers whose butadiene portion has a vinyl content of above 50% by weight can be used with very particular preference.

The inventive rubber mixture can also comprise further rubbers, such as natural rubber and/or synthetic rubbers. Preferred synthetic rubbers are described by way of example in W. Hofmann, Kautschuktechnologie [Rubber technology], Genter Verlag, Stuttgart 1980. Synthetic rubbers that can be used are, inter alia polybutadiene (BR);
polyisoprene (IR);
styrene-butadiene copolymers (SBR), such as emulsion SBR (E-SBR) or solution SBR (S-SBR). The styrene-butadiene copolymers can have styrene content of from 1 to 60% by weight, preferably from 2 to 50% by weight, particularly preferably from 10 to 40% by weight, very particularly preferably from 15 to 35% by weight;
chloroprene (CR);
isobutylene-isoprene copolymers (IIR);
butadiene-acrylonitrile copolymers whose acrylonitrile contents are from 5 to 60% by weight, preferably from 10 to 50% by weight (NBR), particularly preferably from 10 to 45% by weight (NBR), very particularly preferably from 19 to 45% by weight (NBR);
partially hydrogenated or fully hydrogenated NBR rubber (HNBR);
ethylene-propylene-diene copolymers (EPDM);
above-mentioned rubbers which also have functional groups, e.g. carboxy groups, silanol groups or epoxy groups, e.g. epoxidized NR, carboxy-functionalized NBR or silanol—(—SiOH) or silylalkoxy-functionalized (—Si—OR) SBR;
or a mixture of these rubbers.

In one preferred embodiment, the rubbers can be sulphur-vulcanizable.

Mixtures of the abovementioned rubbers whose S-SBR content is above 50% by weight, particularly preferably above 60% by weight, can be used with preference.

Fillers that can be used for the inventive rubber mixtures are the following fillers:

Carbon blacks: The carbon blacks to be used here can be lamp blacks, furnace blacks, gas blacks or thermal blacks. The BET surface areas of the carbon blacks can be from 20 to 200 m$^2$/g. The carbon blacks can, if appropriate, also contain heteroatoms, such as Si.

Amorphous silicas, prepared by way of example via precipitation from solutions of silicates (precipitation silicas) or flame hydrolysis of silicon halides (fumed silicas). The surface area of the silicas can be from 5 to 1000 m$^2$/g, preferably from 20 to 400 m$^2$/g (BET surface area) and their primary particle sizes can be from 10 to 400 nm. The silicas can, if appropriate, also take the form of mixed oxides with other metal oxides, such as Al oxides, Mg oxides, Ca oxides, Ba oxides, Zn oxides and titanium oxides.

Synthetic silicates, such as aluminium silicate, alkaline earth metal silicates, such as magnesium silicate or calcium silicate, with BET surface areas of from 20 to 400 m$^2$/g and with primary particle diameters of from 10 to 400 nm.

Synthetic or natural aluminium oxides and synthetic or natural aluminium hydroxides.

Synthetic or natural calcium carbonates, e.g. precipitated calcium carbonat.

Natural silicates, such as kaolin and other naturally occurring silicas.

Glass fibre and glass fibre products (mats, strands) or glass microbeads.

Mixtures of these fillers can be used for the inventive rubber mixtures.

Amorphous silicas prepared via precipitation of solutions of silicates, with BET surface areas of from 20 to 400 m$^2$/g, particularly preferably from 100 m$^2$/g to 250 m$^2$/g, can preferably be used in amounts of from 5 to 150 parts by weight, based in each case on 100 parts of rubber.

The fillers mentioned can be used alone or in a mixture.

In one particularly preferred embodiment, the rubber mixtures can comprise from 10 to 150 parts by weight of pale-coloured fillers, such as silicas, if appropriate together with from 0 to 100 parts by weight of carbon black, and also from 1 to 25 parts by weight of organo(alkyl polyether silane) of the formula I, based in each case on 100 parts by weight of rubber.

The rubber mixtures can comprise from 0.1 to 50 parts by weight, preferably from 2 to 30 parts by weight, particularly preferably from 3 to 25 parts by weight, of polysulphidic organo(alkyl polyether silane) of the formula I, based in each case on 100 parts by weight of rubber.

The form in which the polysulphidic organo(alkyl polyether silane) of the formula I is added to the mixing process can be pure, or else absorbed onto an inert organic or inorganic carrier, or else the product of previous reaction with an organic or inorganic carrier. Preferred carrier materials can be precipitated or fumed silicas, waxes, thermoplastics, natural or synthetic silicates, natural or synthetic oxides, specifically aluminium oxide or carbon blacks. Another form in which the polysulphidic organo(alkyl polyether silane) of the formula I can be added to the mixing process is that of the product of previous reaction with the filler to be used.

The rubber mixtures can also comprise silicone oil and/or alkylsilane.

The inventive rubber mixtures can comprise further known rubber auxiliaries, e.g. crosslinking agents, vulcanization accelerators, reaction accelerators, reaction retarders, antioxidants, stabilizers, processing aids, plasticizers, waxes or metal oxides, and also, if appropriate, activators, such as triethanolamine or hexanetriol.

Other rubber auxiliaries can be:

polyethylene glycol or/and polypropylene glycol or/and polybutylene glycol whose molar masses are from 50 to 50 000 g/mol, preferably from 50 to 20 000 g/mol, particularly preferably from 200 to 10 000 g/mol, very particularly preferably from 400 to 6000 g/mol, extremely preferably from 500 to 3000 g/mol, hydrocarbon-terminated polyethylene glycol Alk'-O—(CH$_2$—CH$_2$—O)$_{yl}$—H or Alk'-(CH$_2$—CH$_2$—O)$_{yl}$-Alk', hydrocarbon-terminated polypropylene glycol Alk'-O—(CH$_2$—CH(CH$_3$)—O)$_{yl}$—H or Alk'-O—(CH$_2$—CH(CH$_3$)—O)$_{yl}$-Alk', hydrocarbon-terminated polybutylene glycol Alk'-O—(CH$_2$—CH$_2$—CH$_2$—CH$_2$—O)$_{y^I}$—H, Alk'-O—(CH$_2$—CH(CH$_3$)—CH$_2$—O)$_{y^I}$—H, Alk'-O—(CH$_2$—CH$_2$—CH$_2$—CH$_2$—O)$_{y^I}$-Alk' or Alk'-O—(CH$_2$—CH(CH$_3$)—CH$_2$—O)$_{y^I}$-Alk', where the average of y$^I$ is from 2 to 25, preferably from 2 to 15, particularly preferably from 3 to 8 and from 10 to 14, very particularly preferably from 3 to 6 and from 10 to 13, and Alk is a branched or unbranched, unsubstituted or substituted, saturated or unsaturated hydrocarbon having from 1 to 35, preferably from 4 to 25, particularly preferably from 6 to 20, very particularly preferably from 10 to 20, extremely preferably from 11 to 14, carbon atoms, neopentyl glycol HO—CH$_2$—C(Me)$_2$-CH$_2$—OH, pentaerythritol C(CH$_2$—OH)$_4$ or trimethylolpropane CH$_3$—CH$_2$—C(CH$_2$—OH)$_3$ etherified with polyethylene glycol, etherified with polypropylene glycol, etherified with polybutylene glycol, or etherified with a mixture thereof, where the number of repeat units of ethylene glycol, propylene glycol or/and butylene glycol in the etherified polyalcohols can be from 2 to 100, preferably from 2 to 50, particularly preferably from 3 to 30, very particularly preferably from 3 to 15.

To calculate the average value of y$^I$, the analytically determinable amount of polyalkylene glycol units can be divided by the analytically determinable amount of -Alk [(amount of polyalkylene glycol units)/(amount of -Alk)]. By way of example, the amounts can be determined by using $^1$H and $^{13}$C nuclear magnetic resonance spectroscopy.

The amounts used of the rubber auxiliaries can be conventional, depending inter alia on the intended use. Conventional amounts can be amounts of from 0.1 to 50% by weight, based on rubber, for example.

Crosslinking agents that can be used are sulphur or organic sulphur donors.

The inventive rubber mixtures can comprise further vulcanization accelerators. Examples of suitable vulcanization accelerators that can be used are mercapto-benzthiazoles, sulphenamides, guanidines, dithiocarbamates, thioureas, thiocarbonates and also their zinc salts, e.g. zinc dibutyldithiocarbamate.

Amounts that can be used of the vulcanization accelerators and sulphur are from 0.1 to 10% by weight, preferably from 0.1 to 5% by weight, based on the rubber used.

The inventive rubber mixtures can comprise (D) a thiuram sulphide accelerator and/or carbamate accelerator and/or the corresponding zinc salts, (E) a nitrogen-containing co-activator, (F) if appropriate, further rubber auxiliaries and (G) if appropriate, further accelerators.

The invention further provides a process for preparation of the inventive rubber mixtures, characterized in that at least one styrene-butadiene rubber, and at least one filler and one polysulphidic organo(alkyl polyether silane) of the formula (I) are mixed.

Addition of the polysulphidic organo(alkyl polyether silane) of the general formula (I), and also addition of the fillers can take place when the temperatures of the stock are from 100 to 200° C. However, it can also take place at lower temperatures of from 40 to 100° C., for example together with further rubber auxiliaries.

The blending of the rubbers with the filler, if appropriate with rubber auxiliaries and with the polysulphidic organo (alkyl polyether silane) of the general formula (I) can take place in conventional mixing assemblies, such as rolls, internal mixers and mixing extruders. These rubber mixtures can usually be prepared in internal mixers, by first using mixing to incorporate, in one or more successive thermo-mechanical mixing stages, the rubbers, the filler, the polysulphidic organo (alkyl polyether silane) of the general formula (I) and the rubber auxiliaries at from 100 to 170° C. The addition sequence and the addition juncture of the individual components here can have a decisive effect on the properties of the resultant mixture. The resultant rubber mixture can usually receive admixtures of the crosslinking chemicals at from 40 to 110° C. in an internal mixer or on a roll and can usually be processed to give what is known as an unvulcanized mix for the subsequent steps of processing, e.g. shaping and vulcanization.

The inventive rubber mixtures can be vulcanized at temperatures of from 80 to 200° C., preferably from 130 to 180° C., if appropriate under pressure of from 10 to 200 bar.

The inventive rubber mixtures can be used for the production of mouldings, e.g. for the production of pneumatic tyres, of tyre treads, of cable sheathing, hoses, of drive belts, of conveyor belts, of roll coverings, of tyres, of shoe soles, of sealing elements such as sealing rings and of damping elements.

The invention further provides mouldings obtainable from the inventive rubber mixture via vulcanization.

An advantage of the inventive rubber mixtures is that alcohol emission during the mixing process has been reduced and they have better elongation at break when comparison is made with known polysulphidic polyether silanes.

EXAMPLES

Lutensol TO 5 from BASF AG used in the examples comprises a mixture of variously ethoxylated, variously branched C13 alcohols. The mixture comprises the following compounds

HO—(CH$_2$—CH$_2$O)$_2$—C$_{13}$H$_{27}$,

HO—(CH$_2$—CH$_2$O)$_3$—C$_{13}$H$_{27}$,

HO—(CH$_2$—CH$_2$O)$_4$—C$_{13}$H$_{27}$,

HO—(CH$_2$—CH$_2$O)$_5$—C$_{13}$H$_{27}$,

HO—(CH$_2$—CH$_2$O)$_6$—C$_{13}$H$_{27}$,

HO—(CH$_2$—CH$_2$O)$_7$—C$_{13}$H$_{27}$ and

HO—(CH$_2$—CH$_2$O)$_8$—C$_{13}$H$_{27}$.

The average degree of ethoxylation of the C13 alcohols is 5.

Comparative Example 1

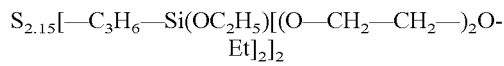

300.3 g of bis(triethoxysilylpropyl)disulphide (Si 266 from Degussa AG) are mixed in a flask with 337 g of diethylene glycol monoethyl ether (from Merck) and 0.51 g of Ti(OBu)$_4$. The mixture is heated to 115° C. under reduced pressure in a distillation apparatus. The pressure is reduced from 400 mbar to 100 mbar within a period of 240 min at 115° C. and the ethanol produced is removed by distillation. This gives 525.1 g of product. The product is studied by nuclear magnetic resonance spectroscopy. 64% of all of the Si—OR groups are Si—O[(O—CH$_2$—CH$_2$—)$_2$O—C$_2$H$_5$] groups.

Comparative Example 2

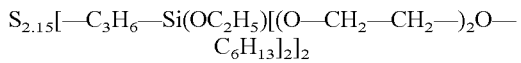

72.9 g of bis(triethoxysilylpropyl)disulphide (Si 266 from Degussa AG) are mixed in a flask with 116.2 g of diethylene glycol monohexyl ether (from Merck) and 0.13 g of Ti(OBu)$_4$. The mixture is heated to 120° C. under reduced pressure in a distillation process. The pressure is reduced from 300 mbar to 75 mbar within a period of 240 min at 120° C. and the ethanol produced is removed by distillation. This gives 159 g of product. The product is studied by nuclear magnetic resonance spectroscopy. 67% of all of the Si—OR groups are Si—O[(O—CH$_2$—CH$_2$—)$_2$O—C$_6$H$_{13}$] groups.

Comparative Example 3

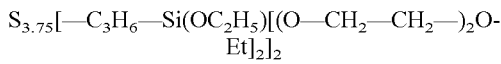

300.2 g of bis(triethoxysilylpropyl)tetrasulphide (Si 69 from Degussa AG) are mixed in a flask with 303.2 g of diethylene glycol monoethyl ether (from Merck) and 0.5 g of Ti(OBu)$_4$. The mixture is heated to 115° C. under reduced pressure in a rotary evaporator. The pressure is reduced from 400 mbar to 75 mbar within a period of 330 min at 115° C. and the ethanol produced is removed by distillation. This gives 499.4 g of product. The product is studied by nuclear magnetic resonance spectroscopy. 65% of all of the Si—OR groups are Si—O[(O—CH$_2$—CH$_2$—)$_2$O—C$_2$H$_5$] groups.

Comparative Example 4

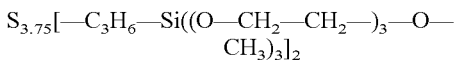

200.8 g of bis(triethoxysilylpropyl)tetrasulphide (Si 69 from Degussa AG) are mixed in a flask with 371.2 g of triethylene glycol monomethyl ether (from Merck) and 0.42 g of Ti(OBu)$_4$. The mixture is heated to 120° C. under reduced pressure in a rotary evaporator. The pressure is reduced from 300 mbar to 75 mbar within a period of 300 min at 120° C. and the ethanol produced is removed by distillation.

Comparative Example 5

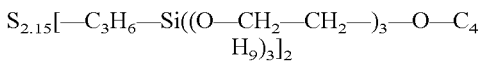

200 g of bis(triethoxysilylpropyl)disulphide (Si 266) are mixed in a flask with 522 g of triethylene glycol monobutyl ether and 0.41 g of Ti(OBu)$_4$. The mixture is heated to 120° C. under reduced pressure in a rotary evaporator. The pressure is reduced from 300 mbar to 75 mbar within a period of 300 min at 120° C. and the ethanol produced is removed by distillation.

Inventive Example 1

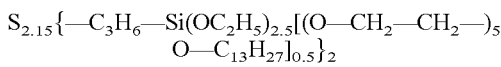

959 g of bis(triethoxysilylpropyl)disulphide (Si 266 from Degussa AG) are mixed in a flask with 848 g of Lutensol TO5 (from BASF AG) and 0.96 g of Ti(OBu)$_4$. The mixture is heated to 140° C. under reduced pressure in a distillation apparatus. The pressure is reduced from 500 mbar to 25 mbar within a period of 420 min at 140° C. and the ethanol produced is removed by distillation.

1712 g of product are isolated. The product is studied by nuclear magnetic resonance spectroscopy and corresponds to the formula

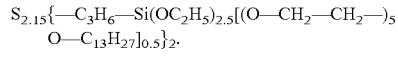

Inventive Example 2

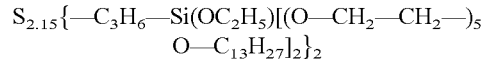

360 g of bis(triethoxysilylpropyl)disulphide (Si 266 from Degussa AG) are mixed in a flask with 1272 g of Lutensol TO5 (from BASF AG) and 0.4 g of Ti(OBu)$_4$. The mixture is heated to 140° C. under reduced pressure in a distillation apparatus. The pressure is reduced from 500 mbar to 50 mbar within a period of 390 min at 140° C. and the ethanol produced is removed by distillation.

1490 g of product are isolated. The product is studied by nuclear magnetic resonance spectroscopy and corresponds to the formula

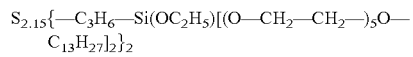

Inventive Example 3

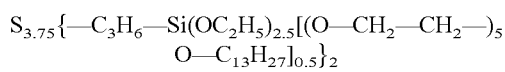

300.2 g of bis(triethoxysilylpropyl)tetrasulphide (Si 69 from Degussa AG) are mixed in a flask with 240 g of Lutensol TO5 (from BASF AG) and 0.44 g of Ti(OBu)$_4$. The mixture is heated to 130° C. under reduced pressure in a distillation apparatus. The pressure is reduced from 150 mbar to 25 mbar within a period of 180 min at 130° C. and the ethanol produced is removed by distillation.

511 g of product are isolated. The product is studied by nuclear magnetic resonance spectroscopy and corresponds to the formula

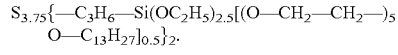

Inventive Example 4

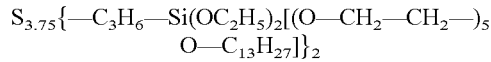

300.3 g of bis(triethoxysilylpropyl)tetrasulphide (Si 69 from Degussa AG) are mixed in a flask with 479 g of Lutensol TO5 (from BASF AG) and 0.45 g of Ti(OBu)$_4$. The mixture is heated to 130° C. under reduced pressure in a distillation apparatus. The pressure is reduced from 150 mbar to 25 mbar within a period of 180 min at 130° C. and the ethanol produced is removed by distillation.

725 g of product are isolated. The product is studied by nuclear magnetic resonance spectroscopy and corresponds to the formula

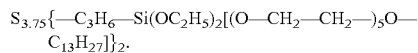

$S_{3.75}\{-C_3H_6-Si(OC_2H_5)_2[(O-CH_2-CH_2-)_5O-C_{13}H_{27}]\}_2$.

Inventive Example 5

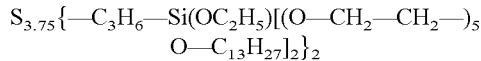

$S_{3.75}\{-C_3H_6-Si(OC_2H_5)[(O-CH_2-CH_2-)_5O-C_{13}H_{27}]_2\}_2$ 300.3 g of bis(triethoxysilylpropyl)tetrasulphide (Si 69 from Degussa AG) are mixed in a flask with 958.2 g of Lutensol TO5 (from BASF AG) and 0.46 g of Ti(OBu)$_4$. The mixture is heated to 130° C. under reduced pressure in a distillation apparatus. The pressure is reduced from 300 mbar to 20 mbar within a period of 240 min at 130° C. and the ethanol produced is removed by distillation.

1151 g of product are isolated. The product is studied by nuclear magnetic resonance spectroscopy and corresponds to the formula

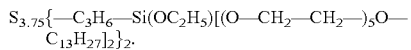

$S_{3.75}\{-C_3H_6-Si(OC_2H_5)[(O-CH_2-CH_2-)_5O-C_{13}H_{27}]_2\}_2$.

Inventive Example 6

Rubber Mixtures

The formulation used for the rubber mixtures is stated in Table 1 below. The unit phr here means proportions by weight, based on 100 parts of the crude rubber used. The metered amount of the silanes is equimolar, i.e. the molar amount is identical. The metered amount of sulphur added is such that the total of this amount and of the free sulphur of the organosilicon compound is identical in all of the mixtures. The general process for preparation of rubber mixtures and their vulcanizates is described in the book: "Rubber Technology Handbook", W. Hofmann, Hanser Verlag 1994.

Comparative Examples 1-3 are alkyl polyether silanes as disclosed in EP 1 285 926. The silanes of the mixtures 4 and 5 are the starting silanes for preparation of the organo(alkyl polyether silanes) of the formula (I), Si 69, a bis(triethoxysilylpropyl)tetrasulphide, and Si 266, a bis(triethoxysilylpropyl)disulphide, commercially available products from Degussa AG.

TABLE 1

| Substance | Mixture 1 Ref. [phr] | Mixture 2 Ref. [phr] | Mixture 3 Ref. [phr] | Mixture 4 Ref. [phr] | Mixture 5 Ref. [phr] | Mixture 6 Inv. Ex. [phr] | Mixture 7 Inv. Ex. [phr] | Mixture 8 Inv. Ex. [phr] | Mixture 9 Inv. Ex. [phr] | Mixture 10 Inv. Ex. [phr] |
|---|---|---|---|---|---|---|---|---|---|---|
| 1st stage | | | | | | | | | | |
| Buna VSL 5025-1 | 96 | 96 | 96 | 96 | 96 | 96 | 96 | 96 | 96 | 96 |
| Buna CB 24 | 30 | 30 | 30 | 30 | 30 | 30 | 30 | 30 | 30 | 30 |
| Ultrasil 7000 GR | 80 | 80 | 80 | 80 | 80 | 80 | 80 | 80 | 80 | 80 |
| Comp. Ex. 1 | 10 | 0 | 0 | 0 | 0 | 0 | 0 | 0 | 0 | 0 |
| Comp. Ex. 2 | 0 | 12.7 | 0 | 0 | 0 | 0 | 0 | 0 | 0 | 0 |
| Comp. Ex. 3 | 0 | 0 | 10.6 | 0 | 0 | 0 | 0 | 0 | 0 | 0 |
| Si 69 | 0 | 0 | 0 | 6.4 | 0 | 0 | 0 | 0 | 0 | 0 |
| Si 266 | 0 | 0 | 0 | 0 | 5.8 | 0 | 0 | 0 | 0 | 0 |
| Inv. Ex. 1 | 0 | 0 | 0 | 0 | 0 | 10.3 | 0 | 0 | 0 | 0 |
| Inv. Ex. 2 | 0 | 0 | 0 | 0 | 0 | 0 | 24 | 0 | 0 | 0 |
| Inv. Ex. 3 | 0 | 0 | 0 | 0 | 0 | 0 | 0 | 10.9 | 0 | 0 |
| Inv. Ex. 4 | 0 | 0 | 0 | 0 | 0 | 0 | 0 | 0 | 15.5 | 0 |
| Inv. Ex. 5 | 0 | 0 | 0 | 0 | 0 | 0 | 0 | 0 | 0 | 24.6 |
| ZnO | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Naftolen ZD | 10 | 10 | 10 | 10 | 10 | 10 | 10 | 10 | 10 | 10 |
| Vulkanox 4020 | 1.5 | 1.5 | 1.5 | 1.5 | 1.5 | 1.5 | 1.5 | 1.5 | 1.5 | 1.5 |
| Protektor G 3108 | 1 | 1 | 1 | 1 | 1 | 1 | 1 | 1 | 1 | 1 |
| 2nd stage | | | | | | | | | | |
| Stage 1 batch | | | | | | | | | | |
| 3rd stage | | | | | | | | | | |
| Stage 2 batch | | | | | | | | | | |
| Vulkacit D | 2 | 2 | 2 | 2 | 2 | 2 | 2 | 2 | 2 | 2 |
| Vulkacit CZ | 1.5 | 1.5 | 1.5 | 1.5 | 1.5 | 1.5 | 1.5 | 1.5 | 1.5 | 1.5 |
| Perkacit TBzTD | 0.2 | 0.2 | 0.2 | 0.2 | 0.2 | 0.2 | 0.2 | 0.2 | 0.2 | 0.2 |
| Sulphur | 2.1 | 2.1 | 1.5 | 1.5 | 2.1 | 2.1 | 2.1 | 1.5 | 1.5 | 1.5 |

The polymer VSL 5025-1 is a solution-polymerized SBR copolymer from Bayer AG whose styrene content is 25% by weight and whose butadiene content is 75% by weight. The copolymer comprises 37.5 phr of oil and its Mooney viscosity (ML 1+4/100° C.) is 50.

The polymer Buna CB 24 is a cis-1,4-polybutadiene (neodymium type) from Bayer AG with cis-1,4 content of at least 96% and with Mooney viscosity of 44±5.

Ultrasil 7000 GR is a readily dispersible silica from Degussa AG whose BET surface area is 170 $m^2/g$.

Naftolen ZD from Chemetall is used as aromatic oil, and Vulkanox 4020 is PPD from Bayer AG and Protektor G3108 is an anti-ozone wax from Paramelt B.V. Vulkacit D (DPG) and Vulkacit CZ (CBS) are commercially available products from Bayer AG. Perkacit TBzTD (tetrabenzylthiuram tetrasulphide) is a product from Flexsys N.V.

The rubber mixtures are prepared in an internal mixer in accordance with the mixing specification in Table 2.

TABLE 2

| Stage 1 | |
|---|---|
| Settings | |
| Mixing assembly | Werner & Pfleiderer E |
| Rotation rate | 70 $min^{-1}$ |
| Ram pressure | 5.5 bar |
| Capacity | 1.58 l |
| Fill level | 0.58 |
| Chamber temp. | 70° C. |
| Mixing procedure | |
| 0-1 min | Buna VSL 5025-1 + Buna CB 24 |
| 1-2 min | ½ silica, ZnO, stearic acid, Naftolen ZD, coupling agent |
| 2-3 min | ½ silica, Vulkanox |
| 3 min | Purge |
| 3-4 min | Mixing and discharge |
| Batch temp. | 140-150° C. |
| Storage | 24 h at room temperature |
| Stage 2 | |
| Settings | |
| Mixing assembly | as in stage 1 except: |
| Rotation rate | 80 $min^{-1}$ |
| Chamber temp. | 80° C. |
| Fill level | 0.56 |
| Mixing procedure | |
| 0-2 min | Breakdown of stage 1 batch |
| 2-3 min | Keep batch temperature at 145° C. via variation of rotation rate |
| 3 min | Discharge |
| Batch temp. | 140-150° C. |
| Storage | 4 h at room temperature |
| Stage 3 | |
| Settings | |
| Mixing assembly | as in stage 1 except |
| Rotation rate | 40 $min^{-1}$ |
| Fill level | 0.55 |
| Chamber temp. | 50° C. |
| Mixing procedure | |
| 0-2 min | Stage 2 batch, accelerator |
| 2 min | Discharge and form sheet on laboratory mixing rolls (diameter 200 mm, length 450 mm, roll temperature 50° C.) Homogenization: Cut the material 5 times towards the left and 5 times towards the right 6 times with wide nip (6 mm) and 3 times with narrow nip (3 mm) Peel milled sheet away. |
| Batch temp. | <110° C. |

Table 3 collates the methods for rubber testing.

TABLE 3

| Physical testing | Standard/conditions |
|---|---|
| ML 1 + 4, 100° C., 2nd and 3rd stage | DIN 53523/3, ISO 667 |
| Ring tensile test, 23° C. | DIN 53504, ISO 37 |
| Tensile strength (MPa) | |
| Elongation at break (%) | |
| Viscoelastic properties, 0° C., 16 Hz, initial force 50 N and amplitude force 25 N | DIN 53 513, ISO 2856 |
| Complex module E * (MPa) | |
| Goodrich flexometer test, 0.250 inch stroke, 25 min, 23° C. | DIN 53533, ASTM D623 A |
| Contact temperature (° C.) | |
| Needle temperature (° C.) | |

TABLE 4

| | Unit | Mixture 1 Ref. | Mixture 2 Ref. | Mixture 3 Ref. | Mixture 4 Ref. | Mixture 5 Ref. | Mixture 6 Inv. Ex. | Mixture 7 Inv. Ex. | Mixture 8 Inv. Ex. | Mixture 9 Inv. Ex. | Mixture 10 Inv. Ex. |
|---|---|---|---|---|---|---|---|---|---|---|---|
| Unvulcanized data | | | | | | | | | | | |
| ML 1 + 4, 2nd stage | [—] | 73 | 65 | 73 | 80 | 82 | 73 | 51 | 68 | 60 | 45 |
| ML 1 + 4, 2nd stage | [—] | 63 | 55 | 67 | 71 | 69 | 62 | 46 | 60 | 55 | 41 |
| Vulcanizate data | | | | | | | | | | | |
| Tensile strength | [MPa] | 11.5 | 10.2 | 12.9 | 12.3 | 11.5 | 13.2 | 11.4 | 13.2 | 13.0 | 10.7 |
| Elongation at break | [%] | 350 | 360 | 370 | 355 | 355 | 400 | 475 | 410 | 435 | 445 |
| E* (0° C.) | [MPa] | 19.0 | 12.1 | 17.0 | 19.5 | 20.2 | 17.3 | 10.1 | 15.8 | 13.8 | 9.3 |
| Contact temperature | [° C.] | 64 | 57 | 63 | 68 | 65 | 62 | 54 | 64 | 61 | 54 |

TABLE 4-continued

|  | Unit | Mixture 1 Ref. | Mixture 2 Ref. | Mixture 3 Ref. | Mixture 4 Ref. | Mixture 5 Ref. | Mixture 6 Inv. Ex. | Mixture 7 Inv. Ex. | Mixture 8 Inv. Ex. | Mixture 9 Inv. Ex. | Mixture 10 Inv. Ex. |
|---|---|---|---|---|---|---|---|---|---|---|---|
| Needle temperature | [° C.] | 104 | 99 | 106 | 116 | 110 | 106 | 98 | 111 | 108 | 97 |

As can be seen from Table 4, all of the inventive mixtures, mixtures 6-10, have markedly higher elongation at break when compared with the comparative examples, while at the same time tensile strengths are comparable. This is surprising, since in the vulcanizate examples in EP 1 285 926 elongation at break becomes impaired as the length of the alkyl radical Alk increases. Furthermore, the elongations at break found are likewise higher than for the triethoxysilanes Si 69 or Si 266 commonly used in the rubber industry.

In a further inventive example, the organo(alkyl polyether silanes) of Inventive Examples 2, 4 and 5 are compared with silanes known from JP 2002145890. These are Comparative Examples 4 and 5. The formulation is stated in Table 5 and the results of the vulcanizate studies are stated in Table 6.

TABLE 5

| Substance | Mixture 11 Ref. [phr] | Mixture 12 Ref. [phr] | Mixture 13 Inv. Ex. [phr] | Mixture 14 Inv. Ex. [phr] | Mixture 15 Inv. Ex. [phr] |
|---|---|---|---|---|---|
| 1st stage | | | | | |
| Buna VSL 5025-1 | 96 | 96 | 96 | 96 | 96 |
| Buna CB 24 | 30 | 30 | 30 | 30 | 30 |
| Ultrasil 7000 GR | 80 | 80 | 80 | 80 | 80 |
| Comp. Ex. 4 | 14.9 | 0 | 0 | 0 | 0 |
| Comp. Ex. 5 | 0 | 17.3 | 0 | 0 | 0 |
| Inv. Ex. 2 | 0 | 0 | 24.0 | 0 | 0 |
| Inv. Ex. 4 | 0 | 0 | 0 | 15.5 | 0 |
| Inv. Ex. 5 | 0 | 0 | 0 | 0 | 24.6 |
| ZnO | 3 | 3 | 3 | 3 | 3 |
| Stearic acid | 2 | 2 | 2 | 2 | 2 |
| Naftolen ZD | 10 | 10 | 10 | 10 | 10 |
| Vulkanox 4020 | 1.5 | 1.5 | 1.5 | 1.5 | 1.5 |
| Protektor G 3108 | 1 | 1 | 1 | 1 | 1 |
| 2nd stage | | | | | |
| Stage 1 batch | | | | | |
| 3rd stage | | | | | |
| Stage 2 batch | | | | | |
| Vulkacit D | 2 | 2 | 2 | 2 | 2 |
| Vulkacit CZ | 1.5 | 1.5 | 1.5 | 1.5 | 1.5 |
| Perkacit TBzTD | 0.2 | 0.2 | 0.2 | 0.2 | 0.2 |
| Sulphur | 1.5 | 2.1 | 2.1 | 1.5 | 1.5 |

TABLE 6

| | Unit | Mixture 11 Ref. | Mixture 12 Ref. | Mixture 13 Inv. Ex. | Mixture 14 Inv. Ex. | Mixture 15 Inv. Ex. |
|---|---|---|---|---|---|---|
| Unvulcanized data | | | | | | |
| ML 1 + 4, 2nd stage | [—] | 65 | 60 | 50 | 58 | 47 |
| ML 1 + 4, 2nd stage | [—] | 59 | 52 | 43 | 50 | 42 |
| Vulcanizate data | | | | | | |
| Tensile strength | [MPa] | 10.9 | 10.6 | 11.0 | 12.8 | 10.6 |
| Elongation at break | [%] | 355 | 380 | 460 | 435 | 435 |
| E* (0° C.) | [MPa] | 15.1 | 11.0 | 9.7 | 13.7 | 9.9 |
| Contact temperature | [° C.] | 61 | 53 | 54 | 62 | 54 |
| Needle temperature | [° C.] | 101 | 95 | 96 | 109 | 97 |

Here again, it is seen that the mixtures with the organo (alkyl polyether silanes) of Inventive Examples 2, 4 and 5 have significantly higher elongations at break when compared with the comparative examples, while tensile strengths are at the same time comparable.

The inventive rubber mixtures with the organo(alkyl polyether silanes) of the formula (I) therefore exhibit markedly improved elongations at break when compared with rubber mixtures with the known polyether silanes.

The invention claimed is:

1. A rubber mixture, comprising
   (A) at least one styrene-butadiene rubber,
   (B) at least one filler,
   (C) more than one polysulphidic organo(alkyl polyether silane) compound of the general formula I

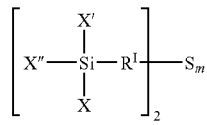

where

X is an alkyl polyether group —O—$((CR^{II}_2)_w$—O—$)_t$-Alk having from 14 to 29 carbon atoms, t=from 2 to 9, w=from 2 to 9, $R^{II}$ is, each independently of the other, H, a phenyl group or an alkyl group, Alk is a branched or unbranched, saturated or unsaturated, aliphatic, aromatic or mixed aliphatic/aromatic monovalent $C_{10}$-$C_{25}$-hydrocarbon group, X' is branched or unbranched alkyl, branched or unbranched alkoxy, a branched or unbranched $C_2$-$C_{25}$ alkenyloxy group, a $C_6$-$C_{35}$ aryloxy group, a branched or unbranched $C_7$-$C_{35}$ alkylaryloxy group, a branched or unbranched $C_7$-$C_{35}$ aralkyloxy group, or an X, X" is branched or unbranched alkyl, branched or unbranched alkoxy, a $C_2$-$C_{25}$ alkenyloxy group, a $C_6$-$C_{35}$ aryloxy group, a branched or unbranched $C_7$-$C_{35}$ alkylaryloxy group, a branched or unbranched $C_7$-$C_{35}$ aralkyloxy group, or an X, $R^I$ is a branched or unbranched, saturated or unsaturated, substituted or unsubstituted, aliphatic, aromatic or mixed aliphatic/aromatic divalent $C_1$-$C_{30}$ hydrocarbon group, m is from 1 to 12, wherein the alkyl polyether groups of the polysulphidic organo(alkyl polyether silane) compounds are variously ethoxylated, (D) a thiuram sulphide accelerator and/or carbamate accelerator and/or the corresponding zinc salts, (E) a nitrogen-containing co-activator, (F) optionally additional rubber auxiliaries, and (G) optionally additional accelerators.

2. The rubber mixture according to claim 1, wherein the polysulphidic organo(alkyl polyether silane) compounds have been absorbed onto an inert organic or inorganic carrier or has been previously reacted with an organic or inorganic carrier.

3. A process for preparation of the rubber mixture according to claim 1 comprising mixing together at least one styrene-butadiene rubber, and at least one filler and more than one polysulphidic organo(alkyl polyether silane) compound of the formula (I) are mixed.

4. A molding formed of the rubber mixture according to claim 1.

5. An article of manufacture made from the rubber mixture according to claim 1.

6. The article of manufacture according to claim 5 which is selected from the group consisting of a pneumatic tire, tire tread, cable sheathing, hose, drive belt, conveyor belt, roll coverings, tire, shoe soles, sealing ring and damping element.

7. The rubber mixture according to claim 1, wherein the alkyl polyether groups of the polysulphidic organo(alkyl polyether silane) compounds have an average degree of ethoxylation of 5.

8. The rubber mixture according to claim 1, wherein the Alk is a $C_{13}$-hydrocarbon group.

9. The rubber mixture according to claim 1, wherein
   Alk is a $C_{13}$-hydrocarbon group, and
   the alkyl polyether groups of the polysulphidic organo (alkyl polyether silane) compounds are variously ethoxylated and have an average degree of ethoxylation of 5.

10. A rubber mixture, comprising
    (A) at least one styrene-butadiene rubber,
    (B) at least one filler,
    (C) more than one polysulphidic organo(alkyl polyether silane) compound of the general formula I

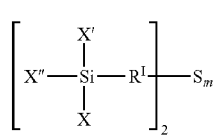

where

X is an alkyl polyether group —O—$((CR^{II}_2)_w$—O—$)_t$-Alk having from 14 to 29 carbon atoms, t=from 2 to 9, w=from 2 to 9, $R^{II}$ is, each independently of the other, H, a phenyl group or an alkyl group, Alk is a branched or unbranched, saturated or unsaturated, aliphatic, aromatic or mixed aliphatic/aromatic monovalent $C_{10}$-$C_{25}$-hydrocarbon group, X' is branched or unbranched alkyl, branched or unbranched alkoxy, a branched or unbranched $C_2$-$C_{25}$ alkenyloxy group, a $C_6$-$C_{35}$ aryloxy group, a branched or unbranched $C_7$-$C_{35}$ alkylaryloxy group, a branched or unbranched $C_7$-$C_{35}$ aralkyloxy group, or an X, X" is branched or unbranched alkyl, branched or unbranched alkoxy, a $C_2$-$C_{25}$ alkenyloxy group, a $C_6$-$C_{35}$ aryloxy group, a branched or unbranched $C_7$-$C_{35}$ alkylaryloxy group, a branched or unbranched $C_7$-$C_{35}$ aralkyloxy group, or an X, $R^I$ is a branched or unbranched, saturated or unsaturated, substituted or unsubstituted, aliphatic, aromatic or mixed aliphatic/aromatic divalent $C_1$-$C_{30}$ hydrocarbon group, m is from 1 to 12, wherein the alkyl polyether groups of the polysulphidic organo(alkyl polyether silane) compounds have different t, (D) a thiuram sulphide accelerator and/or carbamate accelerator and/or the corresponding zinc salts, (E) a nitrogen-containing co-activator, (F) optionally additional rubber auxiliaries, and (G) optionally additional accelerators.

* * * * *